US010151416B2

(12) United States Patent
Taneya et al.

(10) Patent No.: US 10,151,416 B2
(45) Date of Patent: Dec. 11, 2018

(54) PIPE JOINT

(71) Applicant: SMC KABUSHIKI KAISHA, Chiyoda-ku (JP)

(72) Inventors: Yoshimoto Taneya, Koshigaya (JP); Taku Tomita, Katsushika-ku (JP); Shuichi Saito, Tsukubamirai (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 251 days.

(21) Appl. No.: 14/412,724

(22) PCT Filed: Jul. 1, 2013

(86) PCT No.: PCT/JP2013/068010
§ 371 (c)(1),
(2) Date: Jan. 5, 2015

(87) PCT Pub. No.: WO2014/010452
PCT Pub. Date: Jan. 16, 2014

(65) Prior Publication Data
US 2015/0145249 A1    May 28, 2015

(30) Foreign Application Priority Data

Jul. 13, 2012  (JP) ................................. 2012-158035

(51) Int. Cl.
*F16L 55/027* (2006.01)
*F16L 37/091* (2006.01)
(Continued)

(52) U.S. Cl.
CPC ...... *F16L 55/02718* (2013.01); *F15B 15/204* (2013.01); *F15B 21/003* (2013.01);
(Continued)

(58) Field of Classification Search
CPC .......... F16L 55/02718; F16L 55/02754; F16L 37/0915; F15B 15/204
See application file for complete search history.

(56) References Cited

U.S. PATENT DOCUMENTS

| 1,617,614 A | 2/1927 | York |
| 1,682,602 A | 8/1928 | Dawley |

(Continued)

FOREIGN PATENT DOCUMENTS

| DE | 36 03 721 A1 | 3/1987 |
| DE | 197 02 173 C1 | 4/1998 |

(Continued)

OTHER PUBLICATIONS

International Search Report dated Sep. 3, 2013, in PCT/JP2013/068010, filed Jul. 1, 2013.

(Continued)

*Primary Examiner* — David Bochna
(74) *Attorney, Agent, or Firm* — Oblon, McClelland, Maier & Neustadt, L.L.P.

(57) ABSTRACT

A pipe joint has a tube for fluid detachably fitted thereto, and is connected to a hydraulic device such as a cylinder. The pipe joint is provided with a body into which the tube for fluid is inserted, and an attachment/detachment mechanism which is provided inside the body and which can attach/detach the tube for fluid. An inner sleeve for connecting the tube for fluid and the hydraulic device is provided in the body, the inner sleeve being interchangeable with orifices having different opening diameters.

2 Claims, 22 Drawing Sheets

(51) Int. Cl.
*F16D 48/02* (2006.01)
*F15B 15/20* (2006.01)
*F15B 21/00* (2006.01)
*F16L 29/00* (2006.01)

(52) U.S. Cl.
CPC .............. *F16D 48/02* (2013.01); *F16L 29/00* (2013.01); *F16L 37/091* (2013.01); *F16L 37/0915* (2016.05); *F16L 55/027* (2013.01); *F16D 2048/0215* (2013.01); *F16D 2048/0224* (2013.01)

(56) References Cited

U.S. PATENT DOCUMENTS

| | | | |
|---|---|---|---|
| 3,148,703 | A | 9/1964 | Kachline |
| 3,286,731 | A | 11/1966 | Zajac |
| 4,011,893 | A | 3/1977 | Bentley |
| 4,126,303 | A | 11/1978 | Yanagisawa et al. |
| 4,195,631 | A | 4/1980 | Baucom |
| 4,738,665 | A | 4/1988 | Shepard |
| 4,796,924 | A | 1/1989 | Kosugi et al. |
| 4,822,344 | A | 4/1989 | O'Boyle |
| 4,909,490 | A | 3/1990 | De Fontenay |
| 5,176,360 | A | 1/1993 | Winchell et al. |
| 5,287,591 | A | 2/1994 | Bourlon |
| 5,323,773 | A | 6/1994 | Kobayashi |
| 5,722,696 | A | 3/1998 | Taneya |
| 6,443,537 | B2 | 9/2002 | Koyama |
| 2003/0122372 | A1* | 7/2003 | Muto .................. F16L 37/0915 |
| 2003/0173779 | A1* | 9/2003 | Ezura .................. F16L 37/0915 |
| 2004/0080161 | A1* | 4/2004 | Matsushita ......... F16L 37/0915 |
| 2010/0122742 | A1 | 5/2010 | Lin |
| 2011/0025054 | A1* | 2/2011 | Kluss .................. F16L 37/0915 |
| 2011/0140417 | A1* | 6/2011 | Kluss .................. F16L 37/0915 |
| 2012/0024398 | A1 | 2/2012 | Kannoo |
| 2012/0217742 | A1 | 8/2012 | Furuya et al. |
| 2012/0284980 | A1* | 11/2012 | Turnau, III ......... F16L 37/0915 |

FOREIGN PATENT DOCUMENTS

| | | | | |
|---|---|---|---|---|
| DE | 10154588 | A1 * | 6/2002 | ........ F16L 55/02718 |
| DE | 102 08 190 | A1 | 8/2003 | |
| DE | 202012102342 | U1 * | 10/2013 | .......... F16L 37/0915 |
| EP | 0268251 | A1 * | 5/1988 | .......... F16L 37/0915 |
| EP | 0566813 | A1 * | 10/1993 | ........ F16L 55/02718 |
| FR | 2697315 | A1 * | 4/1994 | ........ F16L 55/02718 |
| FR | 2830071 | A1 * | 3/2003 | .......... F16L 37/0915 |
| FR | 2869088 | A1 * | 10/2005 | ........ F16L 55/02718 |
| JP | 51-133631 | | 11/1976 | |
| JP | 53-10436 | | 1/1978 | |
| JP | 57-53189 | U | 3/1982 | |
| JP | 59-147173 | | 8/1984 | |
| JP | 63-1990 | U | 1/1988 | |
| JP | 63-37896 | U | 3/1988 | |
| JP | 63-129631 | | 8/1988 | |
| JP | 1-169697 | U | 11/1989 | |
| JP | 3-26891 | U | 3/1991 | |
| JP | 6-16183 | A | 1/1994 | |
| JP | 06-300150 | | 10/1994 | |
| JP | 10-78165 | | 3/1998 | |
| JP | 2000-199503 | | 7/2000 | |
| JP | 2000-240830 | | 9/2000 | |
| JP | 2001-260846 | | 9/2001 | |
| JP | 2003-194283 | A | 7/2003 | |
| JP | 2003-254303 | | 9/2003 | |
| JP | 2004-11855 | | 1/2004 | |
| JP | 3593382 | | 11/2004 | |
| JP | 2005-114511 | | 4/2005 | |
| JP | 2008-217278 | | 9/2008 | |
| JP | WO 2009150738 | A1 * | 12/2009 | .......... F16L 37/0915 |
| JP | 2011-33133 | A | 2/2011 | |
| JP | 2012-31877 | | 2/2012 | |
| WO | WO 9630689 | A2 * | 10/1996 | ........ F16L 55/02718 |
| WO | WO 03054434 | A1 * | 7/2003 | .......... F16L 37/0915 |
| WO | WO 2011/061947 | A1 | 5/2011 | |
| WO | WO 2014072539 | A1 * | 5/2014 | .......... F16L 37/0915 |

OTHER PUBLICATIONS

Combined Office Action and Search Report dated Oct. 9, 2015 in Chinese Patent Application No. 201380037452.0 with English translation.
Office Action dated Oct. 21, 2015 in Korean Patent Application No. 10-2015-7004023 with partial English translation.
German Office Action dated Feb. 19, 2015 in Patent Application No. 11 2013 003 524.3 (without English Translation).
German Office Action dated Mar. 19, 2015 in Patent Application No. 11 2013 003 519.7 (without English Translation).
Korean Office Action dated Nov. 2, 2015 in Patent Application No. 10-2015-7004022 (with Partial English translation).
Office Action dated May 5, 2016 in Chinese Patent Application No. 201380037452.0 (with English translation).
Office Action dated Apr. 4, 2017 in Japanese Patent Application No. 2014-524744 (with partial English language translation).
Notice of Allowance dated Feb. 13, 2017 in corresponding U.S. Appl. No. 14/412,732.
Office Action dated Oct. 6, 2016 to U.S. Appl. No. 14/412,732.
Japanese Office Action dated Oct. 9, 2018 for Japanese Application No. 2014-524744, with English translation thereof.

* cited by examiner

PIPE JOINT

TECHNICAL FIELD

The present invention relates to a pipe joint for connecting a tube to a fluid pressure device.

BACKGROUND ART

With a fluid pressure device such as a cylinder or the like, for example, a piston, which is arranged in the interior of a cylinder tube, undergoes advancing and retraction movement in an axial direction of the cylinder tube under the action of a fluid pressure such as air pressure or hydraulic pressure, etc.

Heretofore, with a fluid pressure device, for controlling the velocity of the piston, various speed control structures have been adopted. For example, with the speed control mechanism equipped cylinder disclosed in Japanese Laid-Open Patent Publication No. 2004-011855 (hereinafter referred to as conventional technique 1), a cylinder chamber is provided, which is closed by a cover member. The cylinder includes a cylinder body having a pair of ports through which a pressure fluid is supplied to a cylinder chamber, a piston that is installed in the cylinder body and is displaced in the axial direction of the cylinder chamber, and a piston rod connected integrally to the piston.

Furthermore, the cylinder includes a cylindrical body, which is arranged in the interior of the cylinder tube, and is connected to the cover member substantially in parallel with the piston rod. A shaft member, which can be inserted through the interior of the cylindrical body, is connected substantially in parallel in the interior of the piston rod. In addition, the cylinder comprises a first cutout groove, which is formed along the axial direction on an outer circumferential surface of the cylindrical body, a second cutout groove, which is formed along the axial direction along the outer circumferential surface of the shaft member, a first seal member that surrounds the outer circumferential surface of the cylindrical body, and a second seal member that surrounds the outer circumferential surface of the shaft member.

With the cylinder, when the outer circumferential surface of the cylindrical body is surrounded by the first seal member, the flow rate of a pressure fluid that flows between a port and a cylinder chamber is controlled by the first cutout groove. In addition or alternatively thereto, when the outer circumferential surface of the shaft member is surrounded by the second seal member, the flow rate of the pressure fluid that flows between a port and the cylinder chamber is controlled by the second cutout groove.

SUMMARY OF INVENTION

With the aforementioned conventional technique 1, the speed control mechanism is assembled in the interior of the cylinder body.

Therefore, there is a concern that the structure thereof will be made complex, and that compactness of the cylinder in its entirety cannot easily be achieved.

On the other hand, a structure is adopted in which a threaded portion is formed on the circumferential surface of the cylinder body, and a speed control valve, for example a needle valve, is attached by means of the threaded portion. However, with such a needled valve, a handle is provided for the purpose of rotating the needle, and a mistaken operation or malfunctioning of the handle may be caused by mistaken contact with the handle. Additionally, it is easy for differences in operating conditions for the handle to take place when the handle is operated by each of different operators, leading to a risk of variance in the velocity conditions.

Further, a fine hole is formed that penetrates through the threaded portion on the circumferential surface of the cylinder body. For this reason, apart from the process to create the screw hole, separately, it is necessary to machine the fine hole by an extremely small diameter drill. Consequently, operations are made complex, and machining costs rise considerably.

The present invention has been devised in consideration of the aforementioned problems, and has the object of providing a pipe joint that enables desired velocity conditions to be set easily and reliably, together with favorably improving operability.

The present invention relates to a pipe joint that is connected to a fluid pressure device, comprising a body in which a tube is inserted, and an attachment/detachment mechanism disposed in the interior of the body and which is capable of attaching and detaching the tube.

In the pipe joint, an orifice part through which the tube and the fluid pressure device communicate is disposed in the body, and the orifice part is interchangeable.

Further, in the pipe joint, the orifice part may comprise a plurality of orifice members, which are interchangeable with respect to the body, and in the respective orifice members, there may be provided respective orifices whose opening diameters differ from each other.

Furthermore, in the pipe joint, the orifice members may be inner sleeves inserted into a distal end inner circumference of the tube, and a projection that engages with the distal end inner circumference of the tube may be provided on an outer circumferential part of the inner sleeve.

Further still, in the pipe joint, the inner sleeve may include a flange that abuts against the distal end of the tube, and a contact portion of the flange that contacts the distal end of the tube may be formed with an inclined surface.

Further, in the pipe joint, the orifice members may be orifice plates that are inserted and gripped by a gasket on the inner circumference of the body, and the gasket may be retained on the distal end of the tube.

Furthermore, in the pipe joint, the orifice members may be orifice plates that are arranged on an end of the body, and the orifice plates and the body may be connected mutually by a snap fitting.

Further still, in the pipe joint, an o-ring may be interposed between the orifice plate and a distal end outer circumference of the body.

Further, in the pipe joint, a packing member that permits flow of a fluid in one direction only may be arranged between an outer circumference of the orifice member and an inner circumference of the body, and the packing member may be capable of being disposed in an inverted posture.

Furthermore, in the pipe joint, the orifice part may comprise a tubular member that is installed on the distal end inner circumference of the tube, and the orifice member may be arranged in the interior of the tubular member so as to be capable of advancing and retracting in an axial direction of the tubular member.

Further still, in the pipe joint, the orifice member may be capable of being disposed in an inverted posture in the interior of the tubular member.

According to the present invention, the orifice part through which the tube and the fluid pressure device communicate is disposed in the body, so that mistaken operations by an operator, as in the case of the aforementioned speed control valve, can be suppressed to the greatest possible extent. In addition, speed control of the fluid pressure device can be accomplished easily and reliably under the operation of the orifice that is provided in the orifice part.

In particular, by making the orifice part interchangeable, the opening diameter of the orifice can be selected. Therefore, various types of fluid pressure devices can suitably be employed, and an improvement in versatility can easily be achieved. Furthermore, by providing the orifice, there is no need to form a fine hole on the fluid pressure device. As a result, the machining cost for the fine hole is reduced, and an economical configuration is provided.

The above and other objects, features and advantages of the present invention will become more apparent from the following description when taken in conjunction with the accompanying drawings, in which preferred embodiments of the present invention are shown by way of illustrative example.

DESCRIPTION OF EMBODIMENTS

Figure 1:
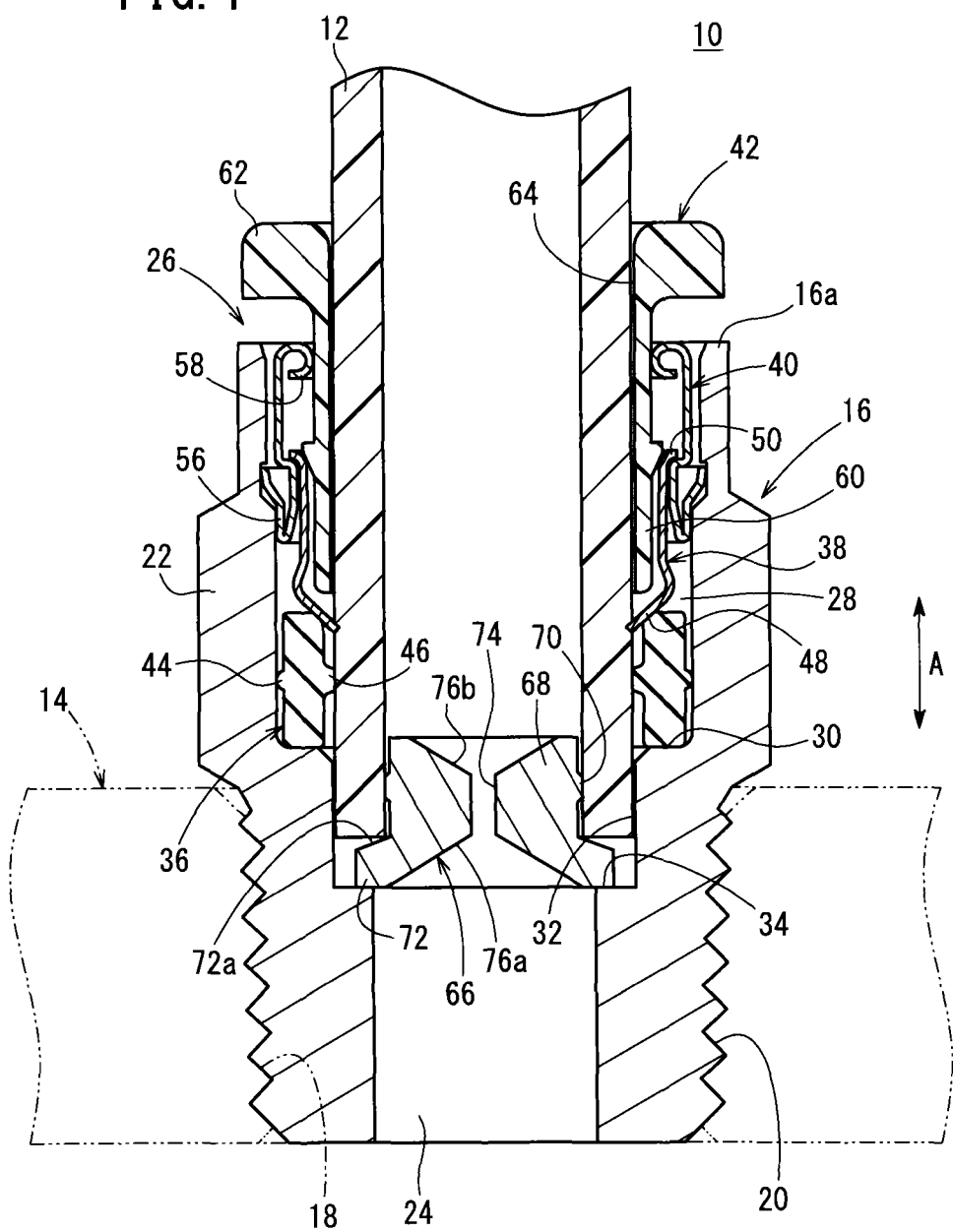
FIG. 1 is an overall vertical cross sectional view of a pipe joint according to a first embodiment of the present invention.

As shown in FIG. 1, in the pipe joint 10 according to a first embodiment of the present invention, a fluid tube 12 is mounted detachably, and the pipe joint 10 is connected, for example, to a fluid pressure device 14 such as a cylinder or the like.

Figure 2:
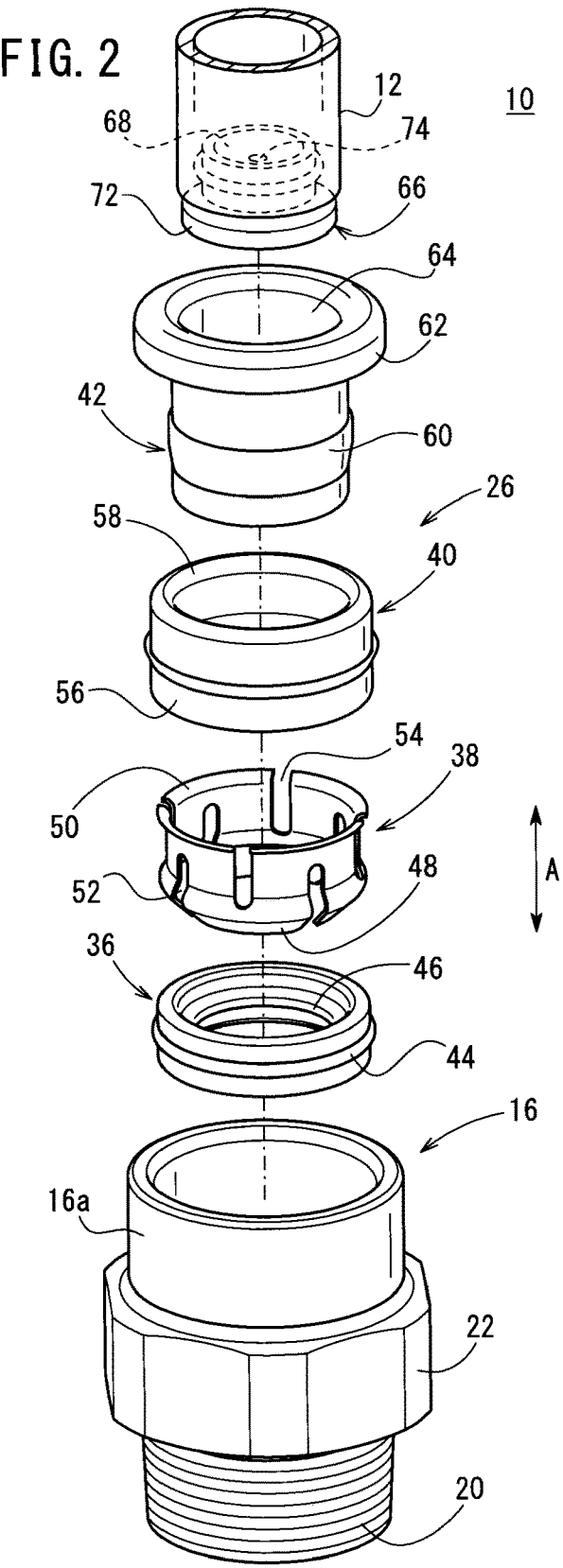
FIG. 2 is an exploded perspective view of the pipe joint.

As shown in FIGS. 1 and 2, the pipe joint 10, for example, is formed from a metal material such as stainless steel or the like, and is equipped with a body 16 having a substantially cylindrical shape. On a distal end in the axial direction (the direction of arrow A) of the body 16, threads 20 are provided, which are screw-engaged in a screw hole 18 of the fluid pressure device 14. A fastening nut 22, which is continuous with the threads 20, is formed on the outer circumference of the body 16. The fastening nut 22, for example, is formed with a hexagonal shape in cross section, and is used when the connection is made to the screw hole 18 using a non-illustrated tool.

As shown in FIG. 1, a fluid passage 24 for enabling the fluid to flow therethrough is formed in the interior of the body 16. The fluid passage 24 penetrates in the axial direction through the body 16 and is opened to the exterior on both ends of the body 16. A first opening 28, in which an attachment/detachment mechanism 26 is incorporated, is formed at a predetermined depth in the axial direction on one end 16a side of the body 16 (on a side opposite from the threads 20). A first stepped portion 30 is disposed at the bottom of the first opening 28, and the first opening 28 communicates through the first stepped portion 30 with a second opening 32, which is reduced in diameter. The second opening 32 has a predetermined depth, and a second stepped portion 34 is disposed at the bottom of the second opening 32.

The attachment/detachment mechanism 26, which is incorporated in the first opening 28, is equipped with an annular packing member 36, a chuck 38 that seizes the fluid tube 12 that is inserted into the body 16, a guide member 40 engaged with an inner circumferential surface of the first opening 28, and a release bush 42 that is displaceable along the guide member 40.

The packing member 36 is formed from an elastic material such as rubber or the like, has a T-shape in cross section, and is arranged to abut against the first stepped portion 30 in the interior of the first opening 28. The packing member 36 is formed in a ring-like shape, and on an outer circumferential surface thereof, a bulging portion 44 is formed, which abuts against the inner circumferential surface of the first opening 28, whereas on an inner circumferential surface thereof, a seal projection part 46 is formed to project in sliding contact with the outer circumferential surface of the fluid tube 12.

The chuck 38 is formed in a substantially cylindrical shape, for example, by press working a thin plate material. Pawls 48, which are inclined radially inward, are formed on one end of the chuck 38, and engagement members 50, which are bent radially outward, are formed on the other end of the chuck 38. Ends of the pawls 48 are formed in a blade-like shape, so as to be capable of biting into the outer circumferential surface of the fluid tube 12.

On one end side of the chuck 38, first slits 52 are formed, which are notched at a predetermined depth toward the other end side. The first slits 52 are disposed in a plurality (e.g., four) at equal intervals in the circumferential direction of the chuck 38.

On the other end side of the chuck 38, second slits 54 are formed, which are notched at a predetermined depth toward the one end side. The second slits 54 are disposed in a plurality (e.g., four) at equal intervals in the circumferential direction of the chuck 38. The first slits 52 and the second slits 54 are disposed alternately at different locations mutually along the circumferential direction of the chuck 38.

The guide member 40, similar to the aforementioned chuck 38, is formed in a substantially cylindrical shape, for example, by press working a thin plate material, and is arranged to abut against the inner circumferential surface of the first opening 28. On one end of the guide member 40, a front end portion 56 is formed, which is folded back at the inside of the first opening 28, and is arranged on the side of the packing member 36. On the other end of the guide member 40, a rear end portion 58 is formed, which is arranged at the open end of the first opening 28, and is bent and curved radially inward with a circular shape in cross section.

The release bush 42, for example, is formed in a cylindrical shape from a resin material. On one end of the release bush 42, a tapered part 60 is formed, which bulges radially outward and gradually reduces in diameter toward the distal end side. The tapered part 60 is disposed in facing relation to the pawls 48 that make up the chuck 38.

On the other end of the release bush 42, a flange 62 is formed that is expanded in diameter radially outward. The outside diameter of the flange 62 is greater than the diameter of the first opening 28. On the inside of the release bush 42, a through hole 64 through which the fluid tube 12 is inserted is formed to penetrate in the axial direction. The inside diameter of the through hole 64 is formed at a substantially constant diameter, which is slightly greater than the outside diameter of the fluid tube 12.

An inner sleeve 66, which abuts against the second stepped portion 34 and serves as an orifice member (orifice part), is arranged in the interior of the body 16. The inner sleeve 66, in addition to a metal material such as aluminum or brass, may be formed by a resin material, and the inner sleeve 66 is attached to the fluid tube 12.

The inner sleeve 66 includes a columnar body section 68, which is inserted on the distal end inner circumference of the fluid tube 12, and a projection 70, which is in sliding contact with the inner circumferential surface of the fluid tube 12, and is formed to project on the outer circumferential surface of the columnar body section 68. A flange 72, which abuts against the distal end of the fluid tube 12, is disposed on one end of the columnar body section 68. The region (proximal end portion) of the flange 72 that is in contact with the distal end of the fluid tube 12, is formed with an inclined surface 72a.

An orifice 74 having a predetermined opening diameter is formed to penetrate in a central portion of the inner sleeve 66. Tapered holes 76a, 76b are disposed in communication with each other on opposite ends of the orifice 74. Concerning the inner sleeve 66, a plurality of such inner sleeves 66 are prepared beforehand, which are capable of being disposed interchangeably with respect to the fluid tube 12, and more specifically, with respect to the body 16. The respective inner sleeves 66 are formed with orifices 74, the opening diameters of which are set to different values, respectively.

Next, operations and advantages of the pipe joint 10 will be described below. The pipe joint 10 is placed beforehand in a state of being screw-engaged and fixed with respect to the fluid pressure device 14 (see FIG. 1).

At first, the pipe joint 10 is in a non-installed state and the fluid tube 12 is not mounted therein. The inner sleeve 66 is inserted beforehand into the distal end inner circumference of the fluid tube 12, and the projection 70 of the inner sleeve 66 is placed in close contact with the distal end inner circumference of the fluid tube 12.

In this case, the fluid tube 12 is inserted from the side of the first opening 28 into the through hole 64 of the release bush 42. At this time, since the fluid tube 12 is inserted through the interior of the packing member 36, the seal projection part 46 is placed in sliding contact with the outer circumferential surface of the fluid tube 12. Therefore, an airtight condition can reliably be maintained between the packing member 36 and the fluid tube 12.

On the other hand, one end of the chuck 38 is pressed and widened radially outward by the fluid tube 12, whereby the pawls 48 come into abutting contact with the outer circumferential surface of the fluid tube 12. Furthermore, the flange 72 of the inner sleeve 66, which is mounted on the distal end inner circumference of the fluid tube 12, comes into abutment against the second stepped portion 34 of the body 16.

Next, when the fluid pressure device 14 is operated, a pressure fluid is supplied or discharged with respect to the fluid tube 12 that is connected to the pipe joint 10. When fluid is supplied from the fluid tube 12 to the interior of the body 16 of the pipe joint 10, the fluid is supplied to the orifice 74 from the tapered hole 76a of the inner sleeve 66 that is arranged on the distal end of the fluid tube 12. As a result, the fluid is supplied to the fluid pressure device 14 after the supplied flow rate thereof is regulated by the orifice 74.

Further, when the fluid is discharged from the fluid pressure device 14 to the interior of the body 16, the fluid is supplied to the orifice 74 from the tapered hole 76b of the inner sleeve 66. As a result, the fluid is discharged into the fluid tube 12 after the discharged flow rate thereof is regulated. Therefore, a speed control (e.g., reciprocating-speed control of a piston) is accomplished in the fluid pressure device 14.

On the other hand, when the fluid tube 12 is separated from the pipe joint 10, the flange 62 of the release bush 42 is pressed toward the side of the body 16. Therefore, the tapered part 60 presses the pawls 48 of the chuck 38, and the pawls 48 are moved in a direction to separate away from the outer circumferential surface of the fluid tube 12.

Consequently, the other end of the chuck 38 is pressed forcibly in a radial outward direction by the release bush 42. Therefore, the pawls 48 that have pierced into the outer circumferential surface of the fluid tube 12 separate away from the outer circumferential surface of the fluid tube 12, and the latched state of the fluid tube 12 by the chuck 38 is released. In addition, by pulling the fluid tube 12 in a direction away from the body 16, the fluid tube 12 is removed from the pipe joint 10.

At this time, the inner sleeve 66 is installed on the distal end inner circumference of the fluid tube 12, and the flange 72 of the inner sleeve 66 includes the inclined surface 72a. Accordingly, a gap is formed between the flange 72 and the distal end of the fluid tube 12, and through the gap, the operator can easily and swiftly remove the inner sleeve 66 from the fluid tube 12.

In this case, according to the first embodiment, the inner sleeve 66, which is provided with the orifice 74 through which the fluid tube 12 and the fluid pressure device 14 communicate, is disposed in the body 16. Therefore, without the occurrence of mistaken operations of a handle by the operator, for example, as in the case of the aforementioned speed control valve (needle valve), the speed control of the fluid pressure device 14 can be performed easily and reliably.

In particular, the inner sleeve 66 is interchangeable, and a plurality of inner sleeves 66 are prepared beforehand, in which the orifices 74 are formed, the opening diameters of which are set to different values, respectively. Consequently, an opening diameter of the orifice 74 can easily be set, thereby enabling adoption thereof in various types of fluid pressure devices 14. In addition, in the multiple fluid pressure devices 14, velocity conditions of the respective pistons thereof (not shown) can be used uniformly. As a result, an improvement in versatility can easily be achieved.

Furthermore, by providing the orifice 74, there is no need to form a fine hole on the fluid pressure device 14. As a result, the machining cost for the fine hole is reduced, and an economical configuration is provided.

Figure 3:
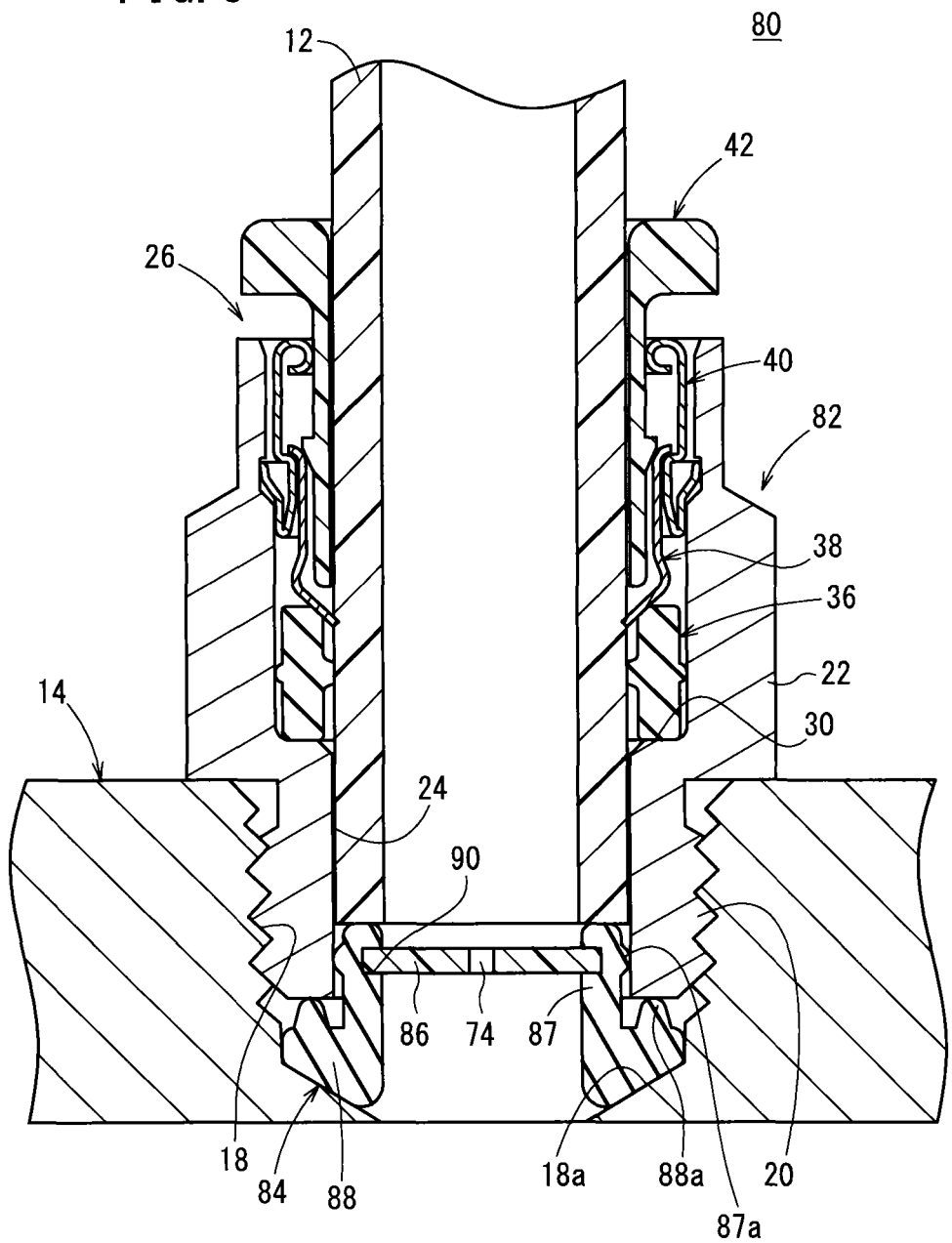
FIG. 3 is an overall vertical cross sectional view of a pipe joint according to a second embodiment of the present invention.

FIG. 3 is an overall vertical cross sectional view of a pipe joint 80 according to a second embodiment of the present invention. Constituent elements, which are the same as those in the pipe joint 10 according to the first embodiment, are denoted by the same reference characters, and detailed description thereof is omitted. In a similar manner, detailed description of such features is omitted in the third and subsequent embodiments of the pipe joint, which will be described below.

The pipe joint 80, for example, is formed from a metal material such as stainless steel or the like, and is equipped with a body 82 having a substantially cylindrical shape. The body 82 does not include the second stepped portion 34 of the body 16 of the first embodiment. In the pipe joint 80, the orifice member is an orifice plate 86 made of resin, which is inserted and gripped by a gasket 84 on the inner circumference of the body 82.

The orifice plate 86 is formed in a circular plate-like shape having a predetermined plate thickness, and in a central portion thereof, an orifice 74 is provided, which is set to a predetermined opening diameter. Although not illustrated, a plurality of orifice plates 86 are prepared beforehand, which are provided with orifices 74, the opening diameters of which are set to different values, respectively.

The gasket 84 includes, as an integral unit, a cylindrical section 87, which is inserted in the interior of the body 82, and a tapered flange 88, which is expanded in diameter from an end of the cylindrical section 87, and then becomes reduced in diameter toward the distal end. On the outer circumference of the cylindrical section 87, a convex seal member 87a is provided in sliding contact with the inner surface of the body 82, whereas on the inner circumference of the cylindrical section 87, a circumferential groove 90 is formed in which the orifice plate 86 is retained. On the proximal end of the tapered flange 88, a convex seal member 88a is provided that abuts against the distal end of the body 82.

With the gasket 84, the distal end of the fluid tube 12 abuts against the end of the cylindrical section 87, and the tapered flange 88 abuts against a wall surface of a tapered hole 18a that communicates with the screw hole 18 of the fluid pressure device 14.

According to the second embodiment, the orifice plate 86 is gripped by the gasket 84 and is attached to the body 82. Therefore, merely by attaching and detaching the gasket 84 with respect to the body 82, an operation to exchange the orifice plate 86 can swiftly and easily be accomplished.

In addition, the distal end of the fluid tube 12 abuts against the end of the cylindrical section 87, and the tapered flange 88 abuts against the wall surface of the tapered hole 18a of the fluid pressure device 14. Consequently, the orifice plate 86 can be securely clamped. Together therewith, the gasket 84 includes a desired sealing function, so there is no need to provide a dedicated seal member.

Figure 4:
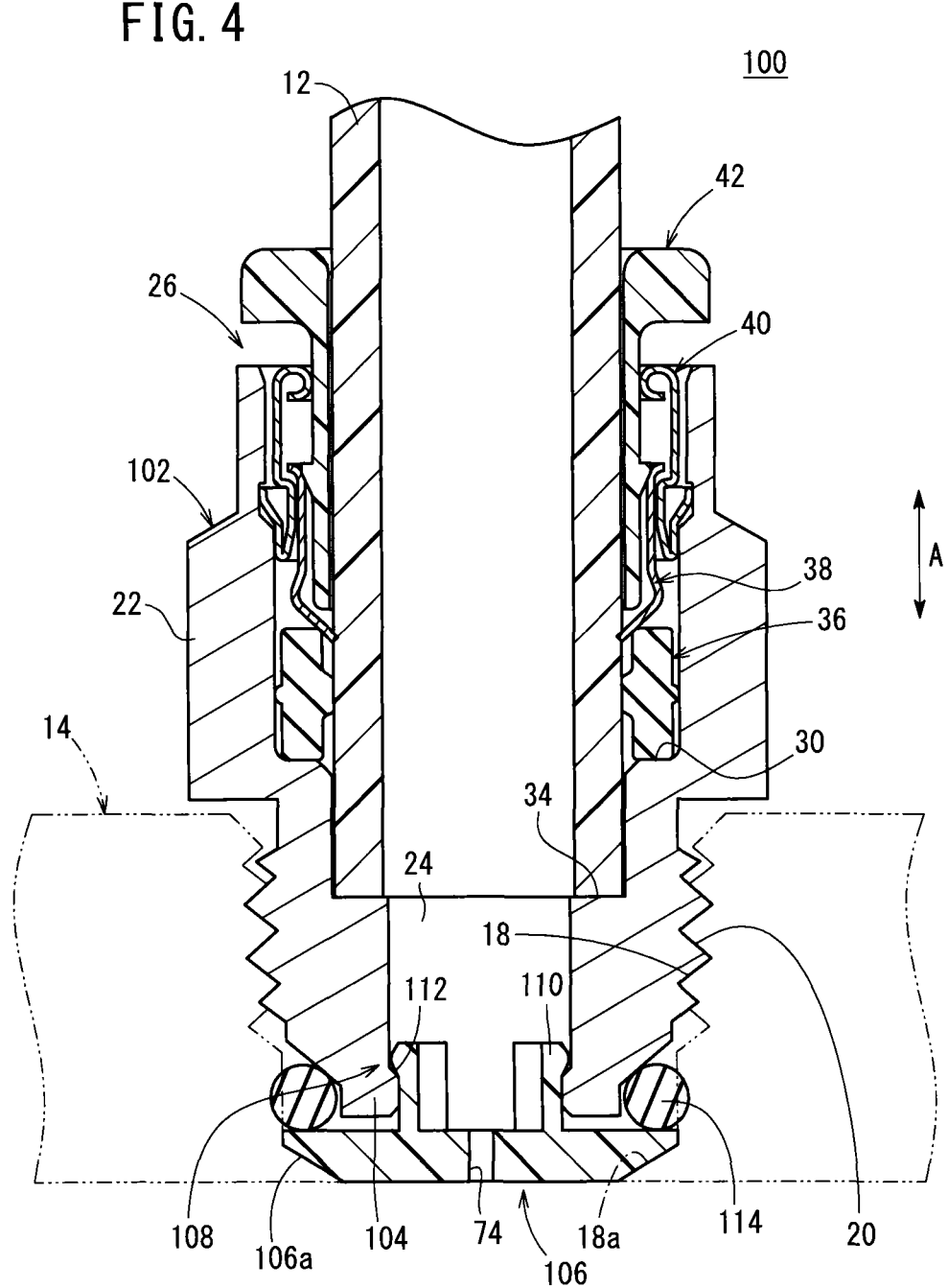
FIG. 4 is an overall vertical cross sectional view of a pipe joint according to a third embodiment of the present invention.

FIG. 4 is an overall vertical cross sectional view of a pipe joint 100 according to a third embodiment of the present invention.

The pipe joint 100, for example, is formed from a metal material such as stainless steel or the like, and is equipped with a body 102 having a substantially cylindrical shape. A small diameter end part 104 is provided on a distal end side of the body 102 that is inserted in the fluid pressure device 14. The small diameter end part 104 is connected from the threads 20, and is reduced in diameter through a tapered part. An orifice plate (orifice member) 106 is disposed on the small diameter end part 104 of the body 102. In addition, the small diameter end part 104 and the orifice plate 106 are connected together mutually by a snap fitting 108.

The orifice plate 106 is formed, for example, by a resin such as a POM (polyacetal) resin or the like, with an orifice 74 being formed in a central portion thereof. The orifice plate 106 has a circular plate-like shape, and on an outer surface (distal end surface) thereof, is formed with a tapered part 106a, which abuts against a wall surface of the tapered hole 18a of the fluid pressure device 14.

Figure 5:
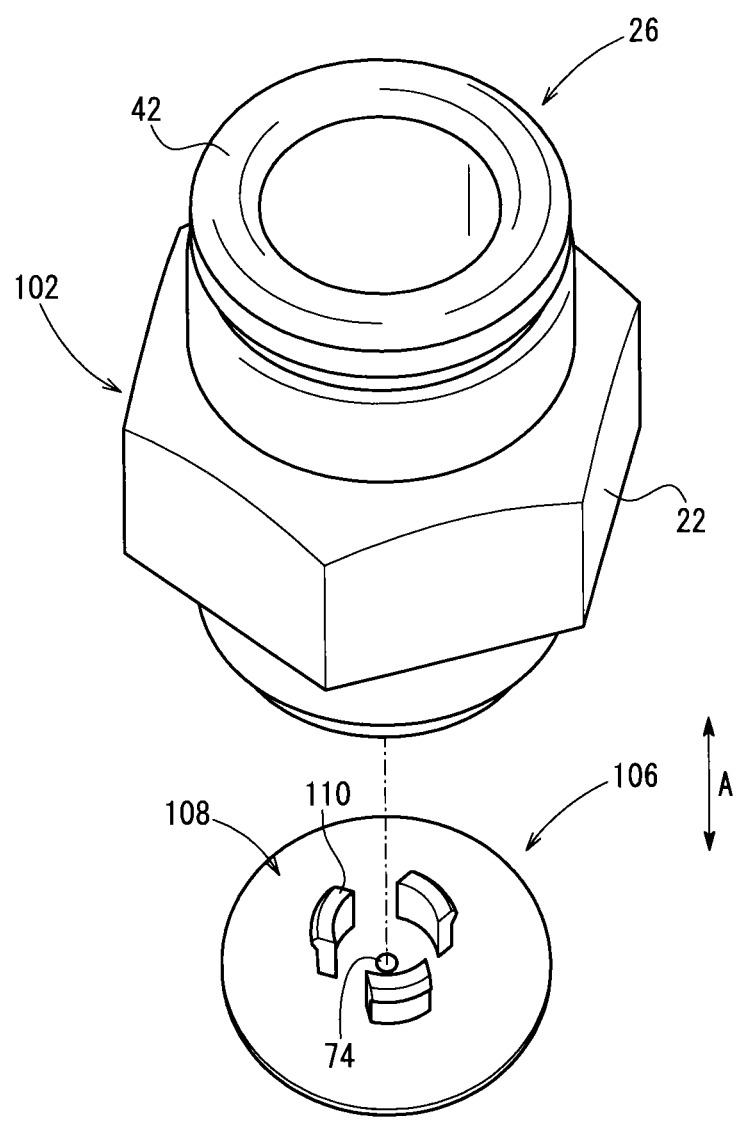
FIG. 5 is an exploded perspective view of main components of the pipe joint.

As shown in FIGS. 4 and 5, on an inside surface (back surface) of the orifice plate 106, a plurality of (e.g., three) pawls 110, which make up the snap fitting 108, are disposed and separated respectively at equal angular intervals about the orifice 74. The respective pawls 110 are elastically deformable in a diametrical direction of the orifice plate 106.

As shown in FIG. 4, inside the small diameter end part 104 of the body 102, a plurality (e.g., three) recesses (grooves) 112 are formed that make up the snap fitting 108. The respective recesses 112 are disposed in corresponding positions to the respective pawls 110. An o-ring 114 is interposed between the outer circumference of the small diameter end part 104 and the inner surface of the orifice plate 106. Although not illustrated, a plurality of orifice plates 106 are prepared beforehand, which are provided with orifices 74, the opening diameters of which are set to different values, respectively.

According to the third embodiment, the orifice plate 106 and the body 102 are connected together mutually by the snap fitting 108. Therefore, the orifice plate 106 can be attached and detached swiftly and easily with respect to the body 102, and the operation to exchange the orifice plate 106 can be accomplished more efficiently.

Figure 6:
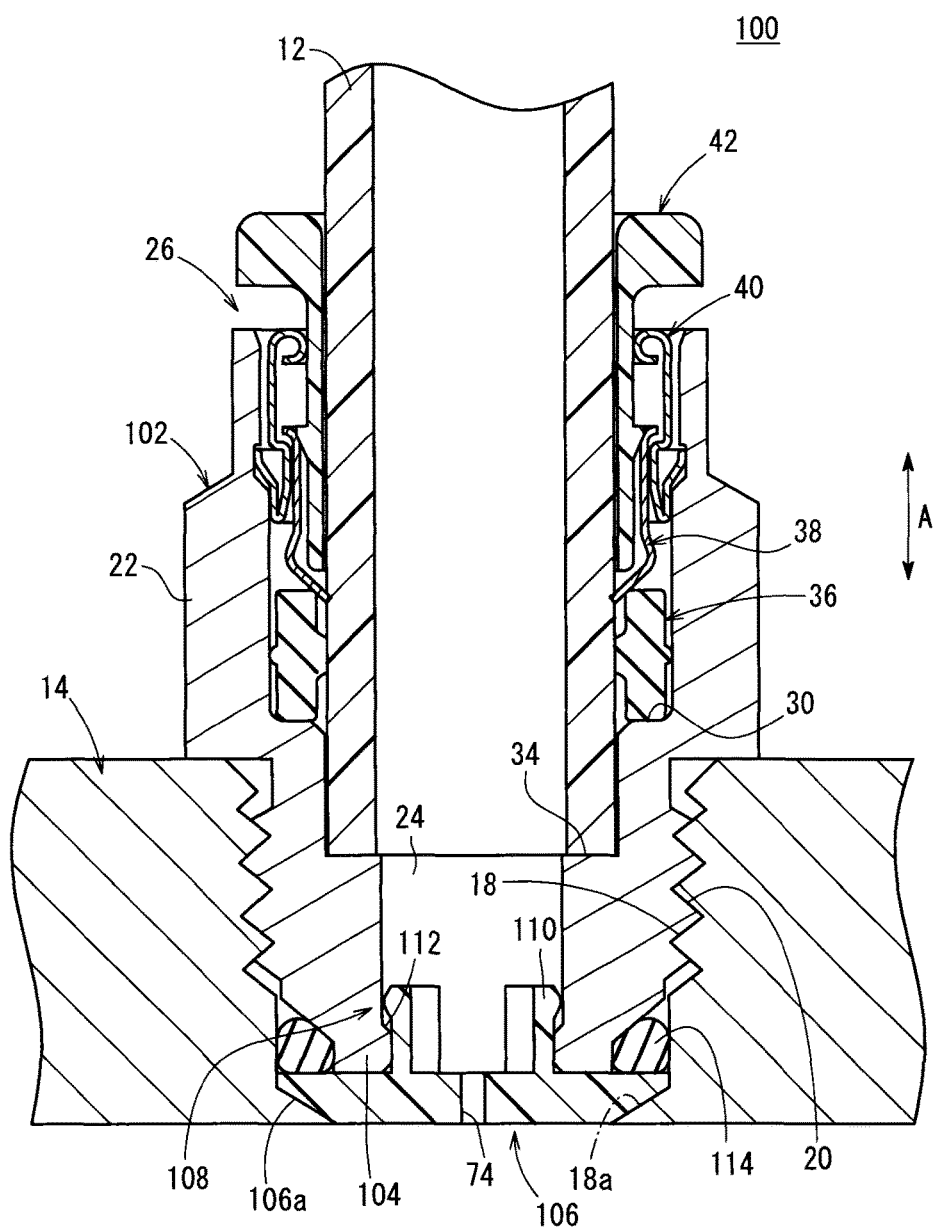
FIG. 6 is a cross sectional schematic view when the pipe joint is attached to a fluid pressure device.

Furthermore, as shown in FIG. 6, in the state in which the pipe joint 100 is connected to the fluid pressure device 14, the tapered part 106a of the orifice plate 106 abuts against a wall surface of the tapered hole 18a of the fluid pressure device 14. Consequently, the inner surface of the orifice plate 106 abuts against the distal end surface of the small diameter end part 104 of the body 102, eliminating any clearance therebetween. As a result, a desired sealing function can be included, so there is no need to provide the body 102 with a dedicated seal member.

Figure 7:
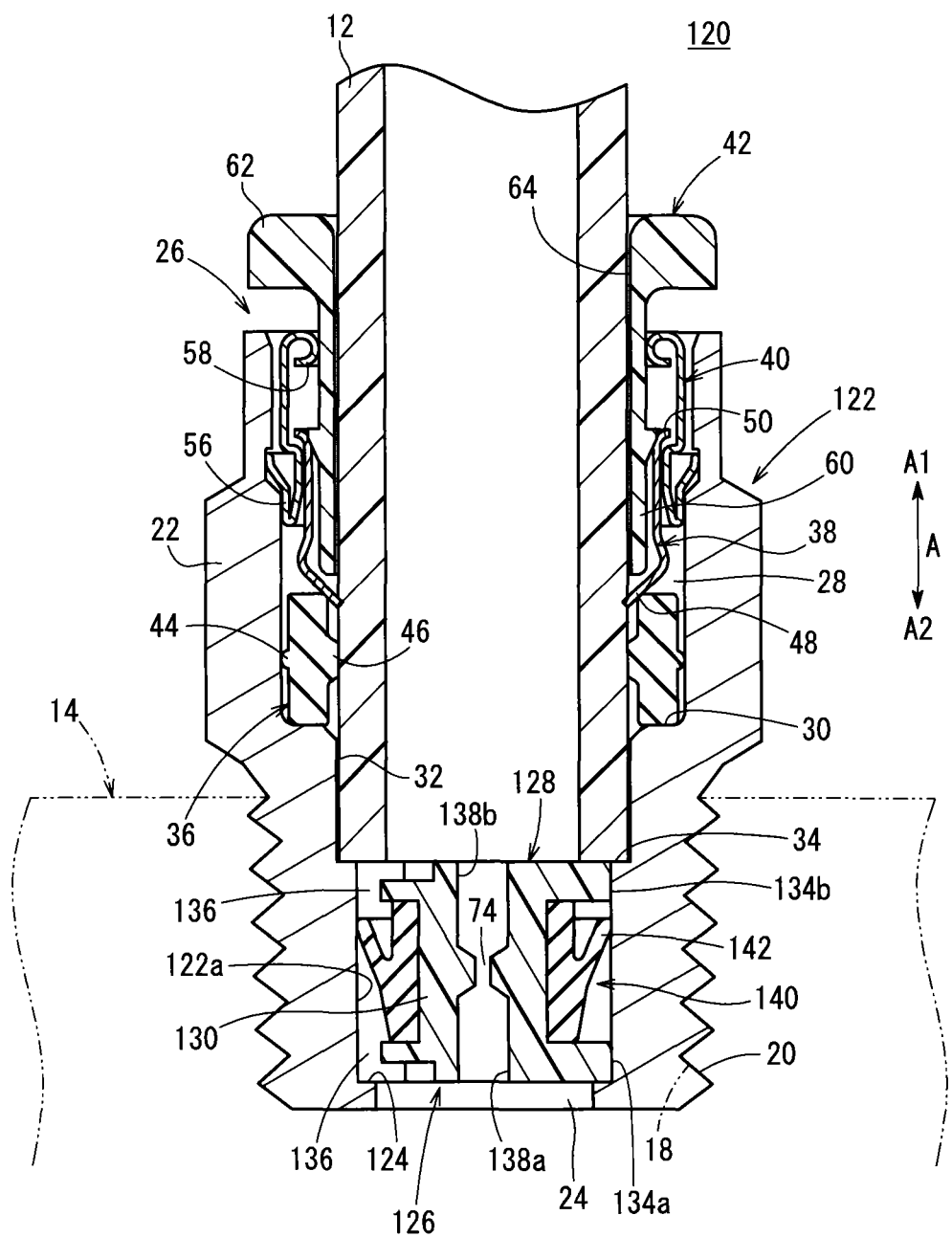
FIG. 7 is an overall vertical cross sectional view of a pipe joint according to a fourth embodiment of the present invention.

FIG. 7 is an overall vertical cross sectional view of a pipe joint 120 according to a fourth embodiment of the present invention.

The pipe joint 120, for example, is formed from a metal material such as stainless steel or the like, and is equipped with a body 122 having a substantially cylindrical shape. The body 122 is constructed substantially in the same manner as the body 16, and together therewith, a third stepped portion 124 is provided on the distal end side of the fluid passage 24, with an orifice part 126 being disposed therein.

The orifice part 126 includes a resin made orifice member 128, which is positioned in the fluid passage 24, and is installed between the third stepped portion 124 and the distal end of the fluid tube 12. In the orifice member 128, as shown in FIGS. 7 and 8, ring sections 132a, 132b are disposed integrally on opposite ends in the axial direction of a columnar body section 130.

Figure 8:
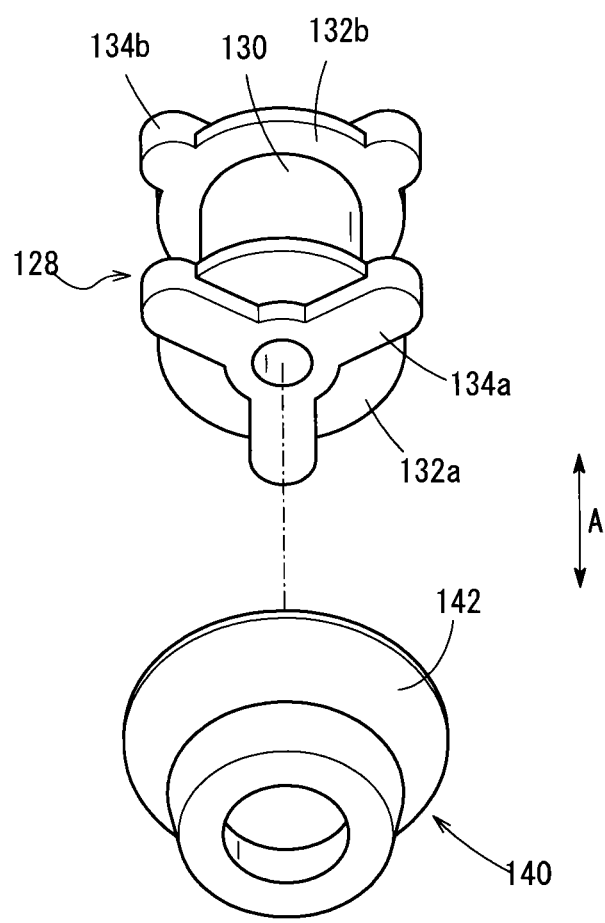
FIG. 8 is an exploded perspective view of an orifice member that constitutes part of the pipe joint.

As shown in FIG. 8, bulging portions 134a, 134b, which project outward and are separated by a predetermined angular interval, are disposed respectively on the ring sections 132a, 132b. The bulging portions 134a, 134b are press-fitted against the inner circumferential surface 122a that forms the fluid passage 24 of the body 122. Gaps 136 are formed between the inner circumferential surface 122a of the fluid passage 24 and the outer circumference of the ring sections 132a, 132b (see FIG. 7).

An orifice 74 is formed along the axial direction at an inside center part of the orifice member 128. Large diameter holes 138a, 138b communicate on opposite end sides of the orifice 74.

A rubber packing member 140 is mounted externally on a columnar body section 132 of the orifice member 128. An inclined seal member 142, which expands in diameter while being inclined outwardly from the fluid passage 24 toward the side of the fluid tube 12, is disposed on the outer circumference of the packing member 140. The inclined seal member 142, by being placed in contact with the inner circumferential surface 122a of the fluid passage 24, functions as a check valve, which allows fluid to flow along the gaps 136 only in the direction of the arrow A1, and restricts flow of the fluid in the direction of the arrow A2.

According to the fourth embodiment, the orifice member 128 is press-fitted on the inner circumferential surface 122a of the body 122, whereby the attachment and detachment operation of the orifice member 128 can easily be accomplished. In addition, as shown in FIG. 7, the fluid, which is discharged to the interior of the body 122 from the fluid pressure device 14, passes through the gaps 136, thus causing the inclined seal member 142 to be deformed inwardly, and the fluid is discharged to the interior of the fluid tube 12.

Figure 9:
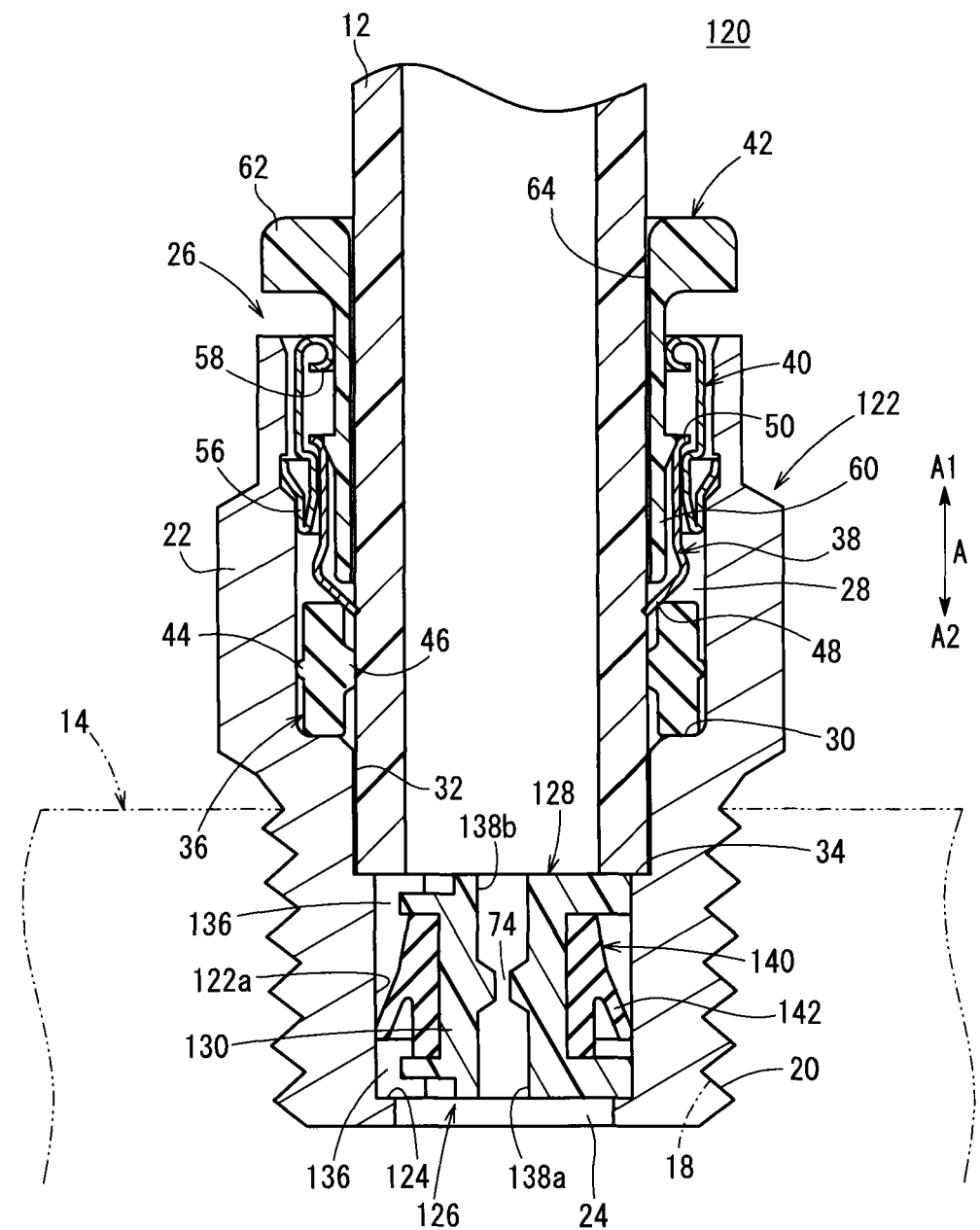
FIG. 9 is an overall cross sectional view of a condition in which the orifice member is inverted in the pipe joint.

Furthermore, with the fourth embodiment, as shown in FIG. 9, the packing member 140 can be installed in an inverted posture on the columnar body section 130 of the orifice member 128. Therefore, fluid that is supplied to the interior of the body 122 from the fluid tube 12 can cause the inclined seal member 142 to be deformed, thus enabling the fluid to be supplied through the gaps 136 to the fluid pressure device 14. Accordingly, simply by converting the attachment posture of the packing member 140, the flow direction of the fluid can easily be changed.

Figure 10:
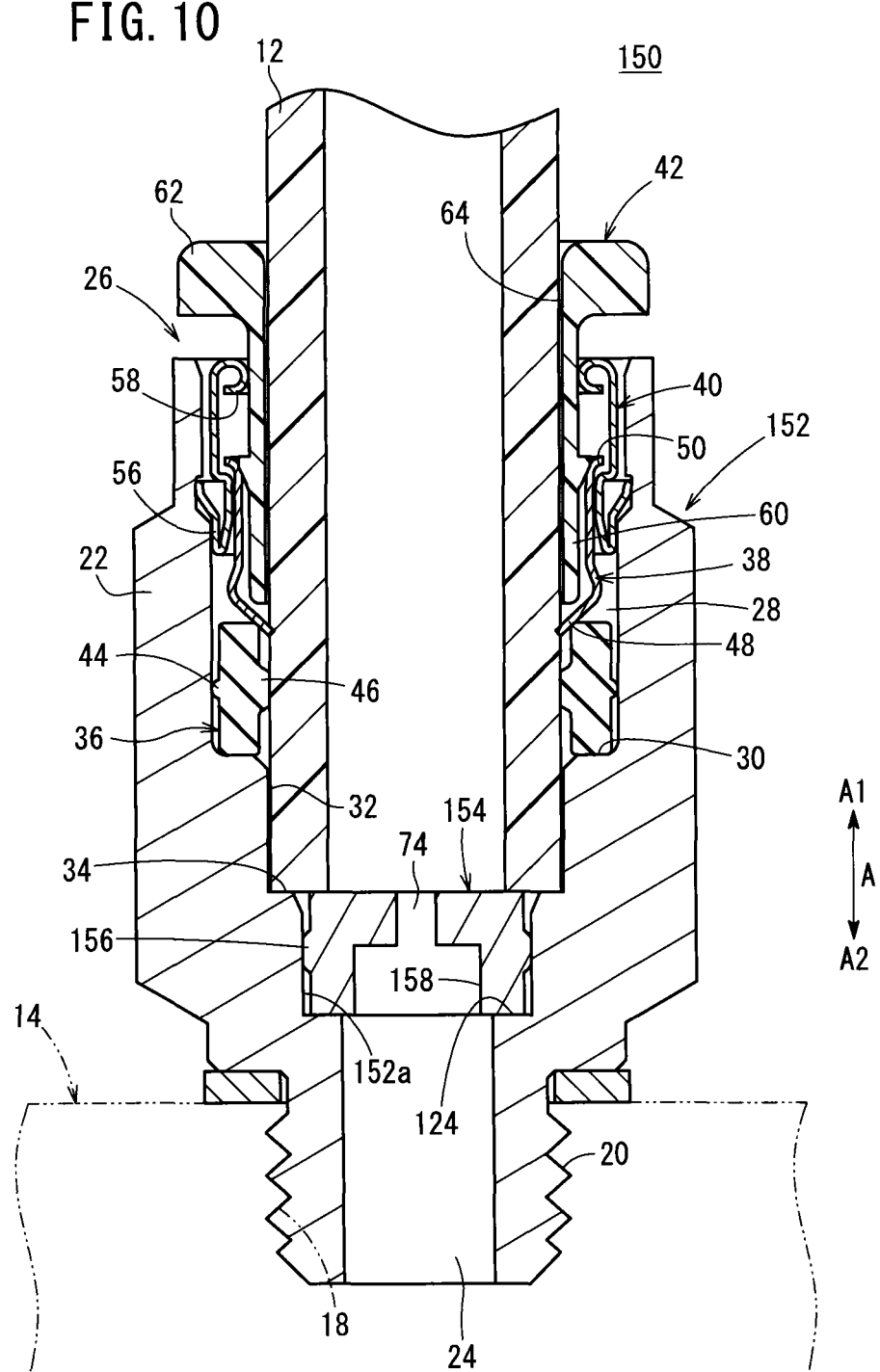
FIG. 10 is an overall vertical cross sectional view of a pipe joint according to a fifth embodiment of the present invention.

FIG. 10 is an overall vertical cross sectional view of a pipe joint 150 according to a fifth embodiment of the present invention.

The pipe joint 150, for example, is formed from a metal material such as stainless steel or the like, and is equipped with a body 152 having a substantially cylindrical shape. The body 152 is constructed substantially in the same manner as the above-described body 16, and an inner circumferential surface 152a thereof is formed between the second stepped portion 34 and the third stepped portion 124. A resin made orifice member (orifice part) 154 is arranged on the inner circumferential surface 152a by being gripped between the distal end of the fluid tube 12 and the third stepped portion 124.

The orifice member 154 has a substantially cylindrical columnar shape, with a projection 156, which is formed to project in sliding contact with the inner circumferential surface 152a of the body 152 on an outer circumferential part of the orifice member 154. The orifice 74 is formed in a central portion of the orifice member 154 at a predetermined depth from the side of the fluid tube 12, and a large diameter opening 158 communicates with the orifice 74.

According to the fifth embodiment, the shape of the orifice member 154 is further simplified, and by exchanging the orifice members 154, versatility can be improved.

Figure 11:
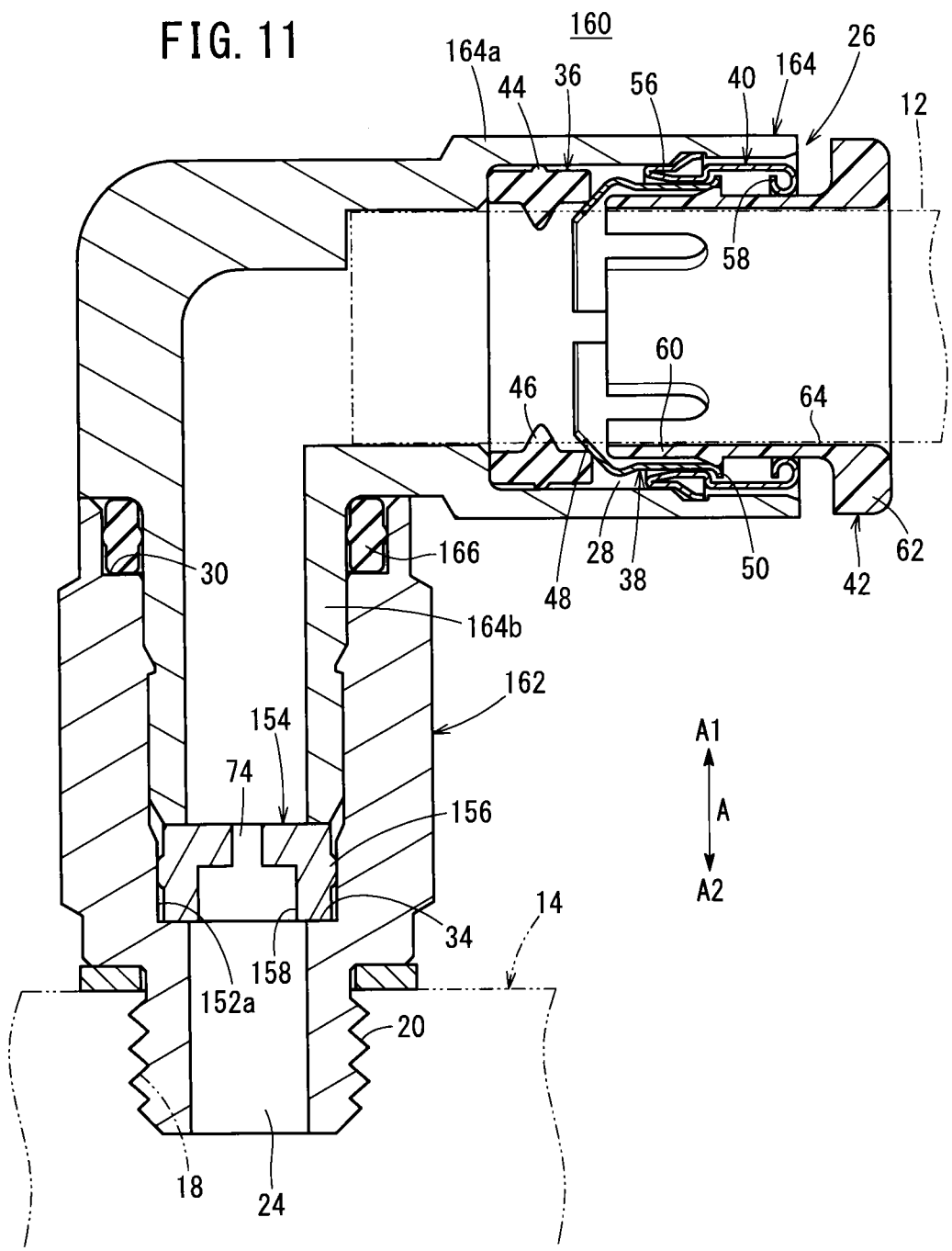
FIG. 11 is an overall vertical cross sectional view of a pipe joint according to a sixth embodiment of the present invention.

FIG. 11 is an overall vertical cross sectional view of a pipe joint 160 according to a sixth embodiment of the present invention. Constituent elements thereof, which are the same as those of the fifth embodiment shown in FIG. 10, are denoted by the same reference characters, and detailed description of such features is omitted.

The pipe joint 160 is equipped with a first body 162, which is connected to the fluid pressure device 14, and a second body 164, in which the fluid tube 12 is inserted. The first body 162, for example, is formed from a metal material such as stainless steel or the like, and has a substantially cylindrical shape.

The second body 164, for example, is formed from a metal material such as stainless steel or the like, and is bent with a substantially L-shape in cross section. The second body 164 includes, integrally, a main body section 164a in which the attachment/detachment mechanism 26 is incorporated, and a small diameter tubular section 164b, which is bent at an end portion of the main body section 164a. The tubular section 164b is inserted into the first body 162, and the orifice member 154 is arranged between the second stepped portion 34 and the distal end of the tubular section 164b. An o-ring 166 is arranged on the first stepped portion 30 in sliding contact with the outer circumference of the tubular section 164b.

With the sixth embodiment, the same advantages as those of the above-described fifth embodiment can be obtained, and the insertion angle of the fluid tube 12 with respect to the fluid pressure device 14 can be changed.

Figure 12:
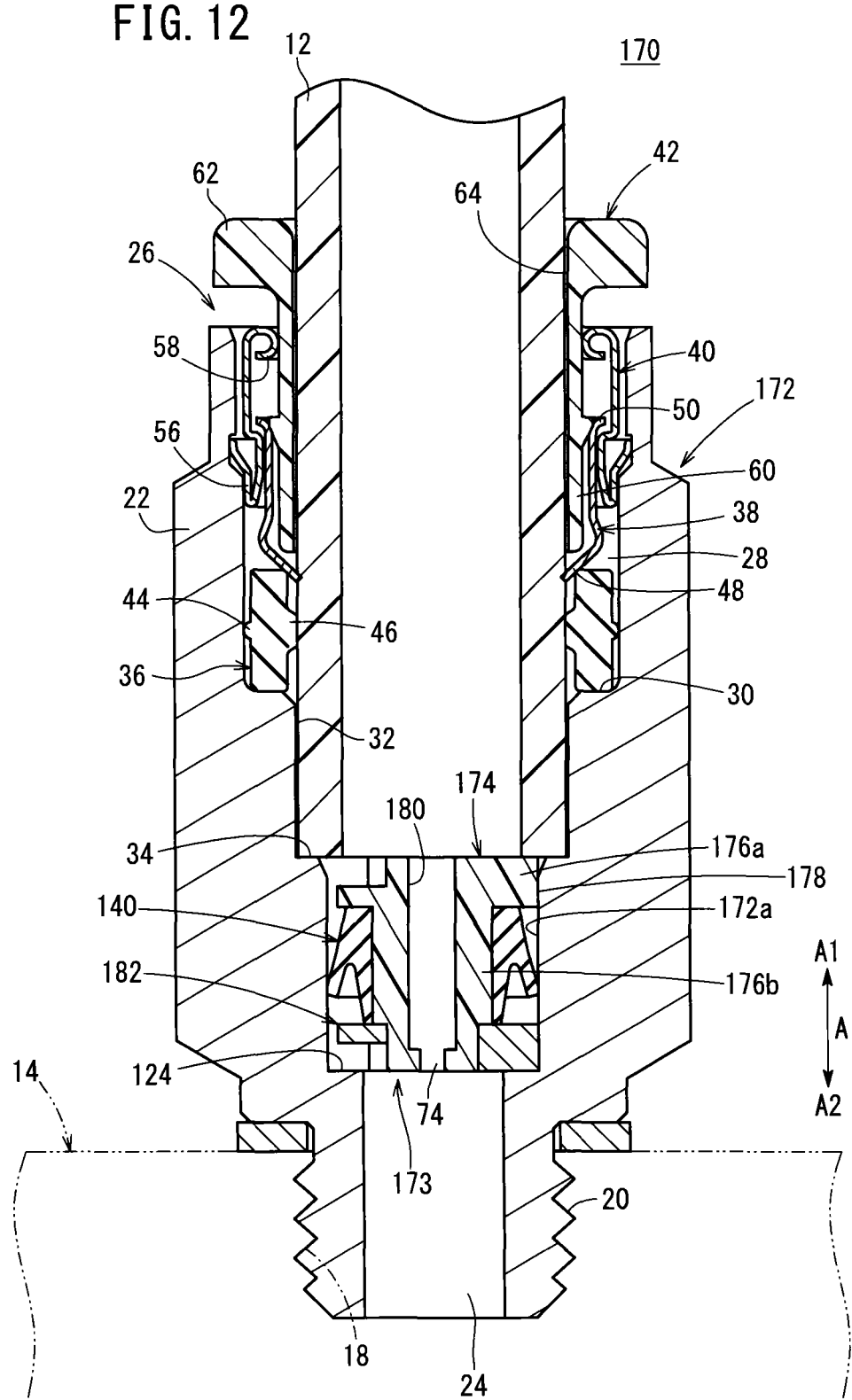
FIG. 12 is an overall vertical cross sectional view of a pipe joint according to a seventh embodiment of the present invention.

FIG. 12 is an overall vertical cross sectional view of a pipe joint 170 according to a seventh embodiment of the present invention.

The pipe joint 170, for example, is formed from a metal material such as stainless steel or the like, and is equipped with a body 172 having a substantially cylindrical shape. An orifice part 173 is arranged in the interior of the body 172, and is positioned between the distal end of the fluid tube 12 and the third stepped portion 124.

Figure 13:
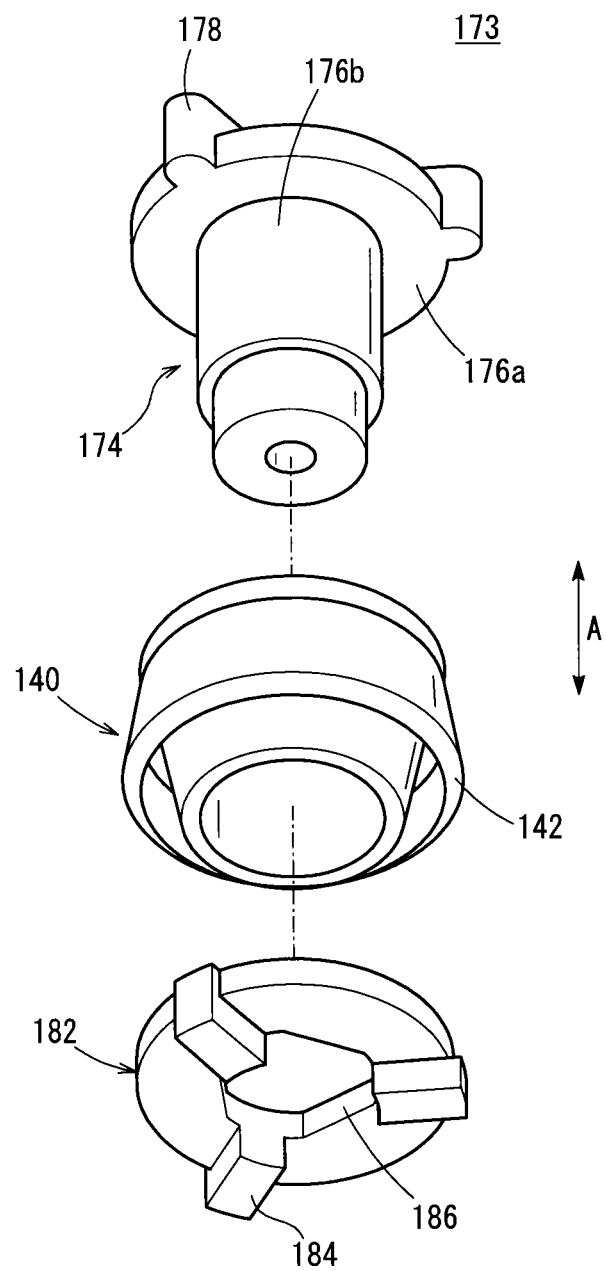
FIG. 13 is an exploded perspective view of an orifice member that constitutes part of the pipe joint.

As shown in FIGS. 12 and 13, the orifice part 173 includes a resin made orifice member 174. The orifice member 174 has a ring section 176a, and a stepped columnar body section 176b that bulges out from one side surface of the ring section 176a.

A predetermined number of (e.g., three) bulging portions 178, which project outwardly, are disposed on an outer circumferential portion of the ring section 176a. The respective bulging portions 178 are press-fitted on the inner circumferential surface 172a of the body 172.

As shown in FIG. 12, in a center portion of the stepped columnar body section 176b, a large diameter hole 180 is formed from a side of the ring section 176a toward a leading edge portion thereof. A small diameter orifice 74 is formed in the leading edge portion. A packing member 140 is mounted externally on the stepped columnar body section 176b, and a resin made ring member 182 is attached to the distal end side thereof.

As shown in FIG. 13, the ring member 182 is provided with a predetermined number of (e.g., three) bulging portions 184, which project outwardly. The respective bulging portions 184 are press-fitted on the inner circumferential surface 172a of the body 172. A substantially triangular shaped opening 186 is formed in a center portion of the ring member 182, and the stepped columnar body section 176b is pressed-fitted in the opening 186.

With the seventh embodiment, the same advantages as those of the above-described first through sixth embodiments can be obtained.

Figure 14:
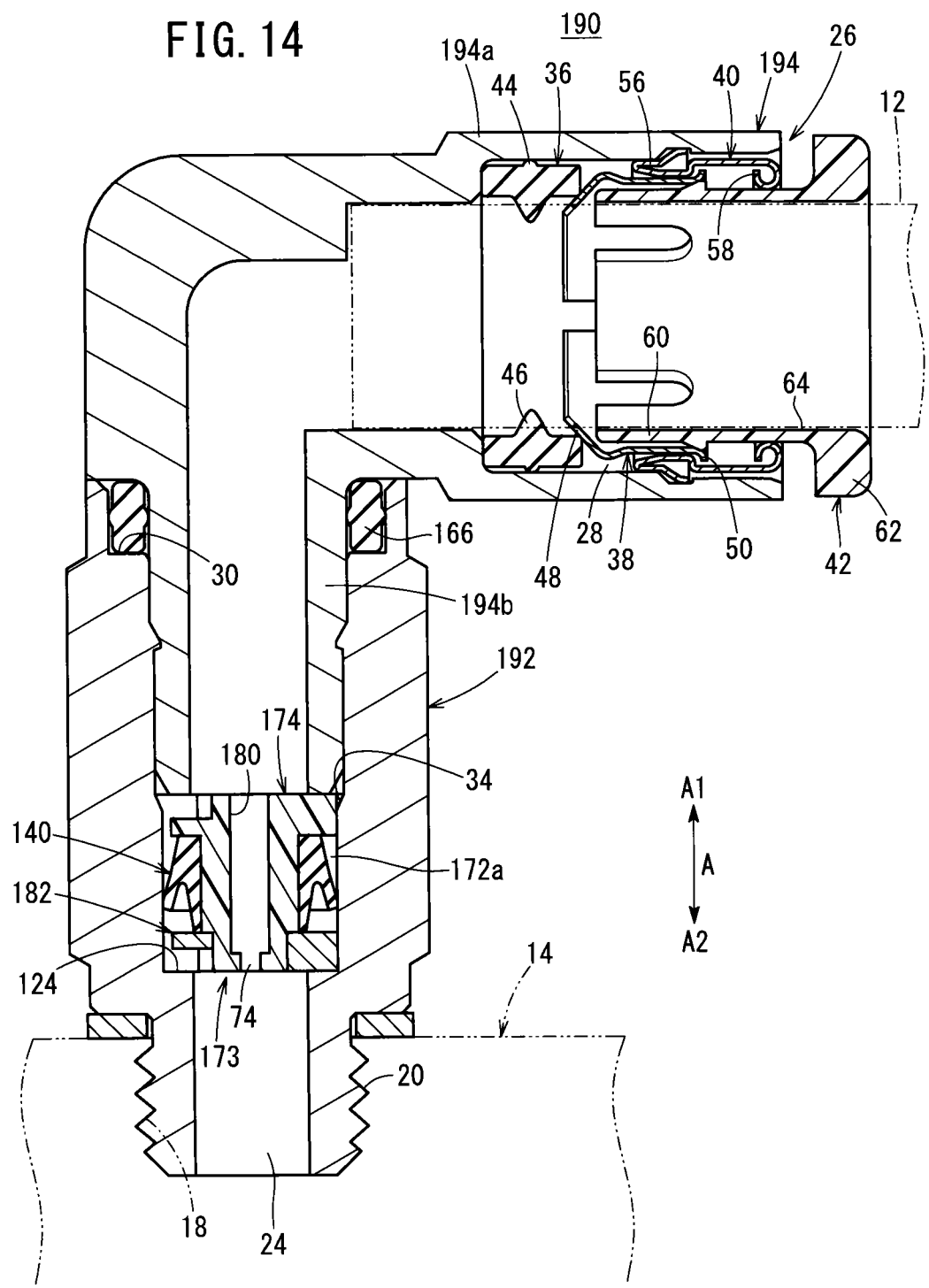
FIG. 14 is an overall vertical cross sectional view of a pipe joint according to an eighth embodiment of the present invention.

FIG. 14 is an overall vertical cross sectional view of a pipe joint 190 according to an eighth embodiment of the present invention. Constituent elements thereof, which are the same as those in the pipe joint 170 according to the seventh embodiment, are denoted by the same reference characters, and detailed description of such features is omitted.

The pipe joint 190 comprises a first body 192 and a second body 194, and is bent in a substantially L-shape as a whole. The first body 192, for example, is formed from a metal material such as stainless steel or the like, and has a substantially cylindrical shape.

The second body 194, for example, is formed from a metal material such as stainless steel or the like, and includes a main body section 194a in which the attachment/detachment mechanism 26 is disposed, and a small diameter tubular section 194b, which is bent at substantially 90° on an end of the main body section 194a. The tubular section 194b is inserted into the first body 192 through an intervening o-ring 166, and the orifice part 173 is arranged between the third stepped portion 124 and the distal end of the tubular section 194b.

According to the eighth embodiment, similar to the above-described sixth embodiment, an effect is obtained in that the insertion angle of the fluid tube 12 with respect to the fluid pressure device 14 can be changed.

Figure 15:
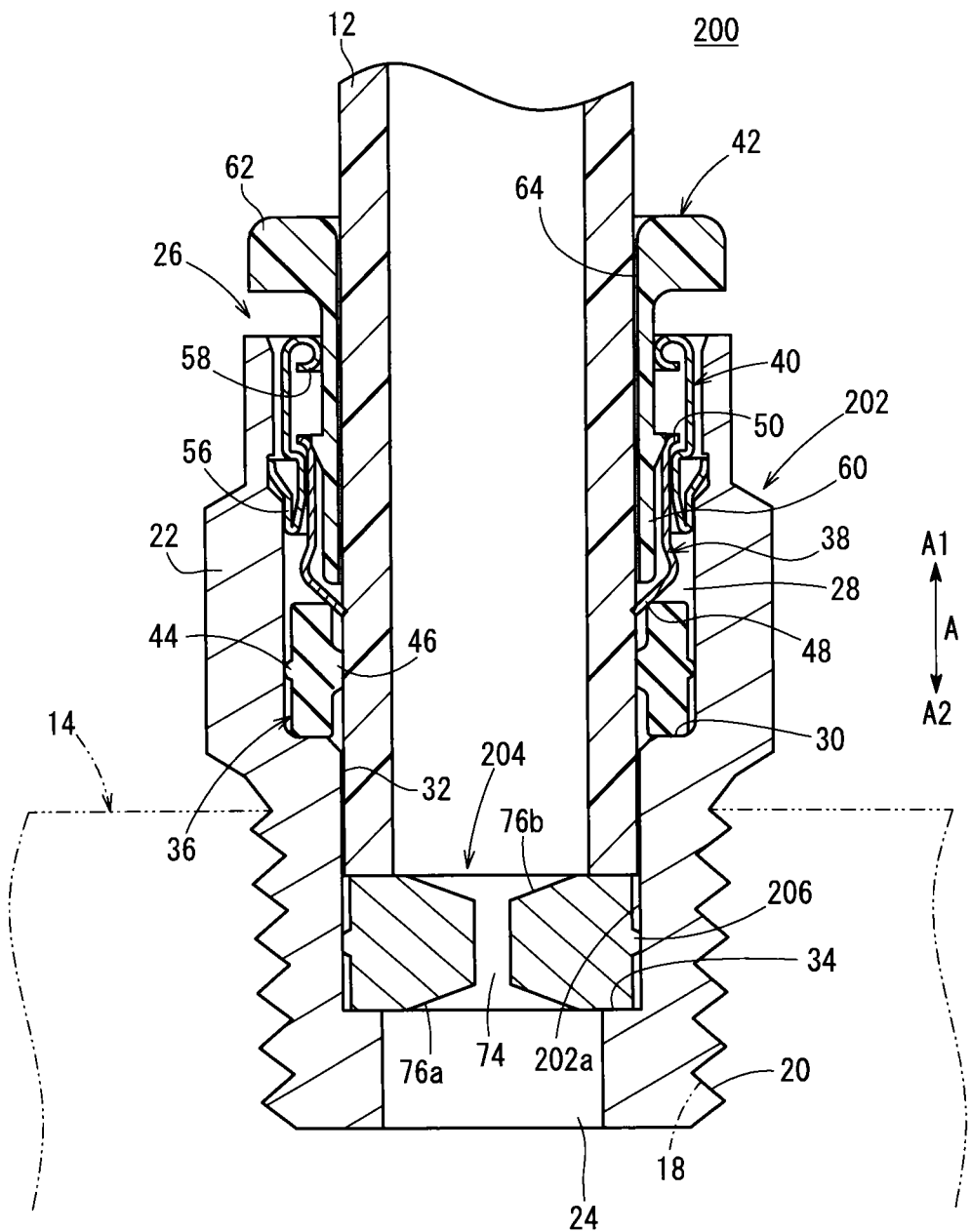
FIG. 15 is an overall vertical cross sectional view of a pipe joint according to a ninth embodiment of the present invention.

FIG. 15 is an overall vertical cross sectional view of a pipe joint 200 according to a ninth embodiment of the present invention.

The pipe joint 200, for example, is formed from a metal material such as stainless steel or the like, and is equipped with a body 202 having a substantially cylindrical shape. An orifice member (orifice part) 204 is arranged in the interior of the body 202, and is positioned between the distal end of the fluid tube 12 and the second stepped portion 34. The orifice member 204, for example, may be made of brass or aluminum, or alternatively, from a resin material.

The orifice member 204 has a substantially circular plate shape, with a projection 206, which is formed to project in sliding contact with the inner circumferential surface 202a of the body 202 on an outer circumferential part of the orifice member 204. The projection 206 may be disposed in a ring shaped recess on the inner circumferential surface 202a.

With the ninth embodiment, the same advantages as those of the above-described first through eighth embodiments can be obtained.

Figure 16:
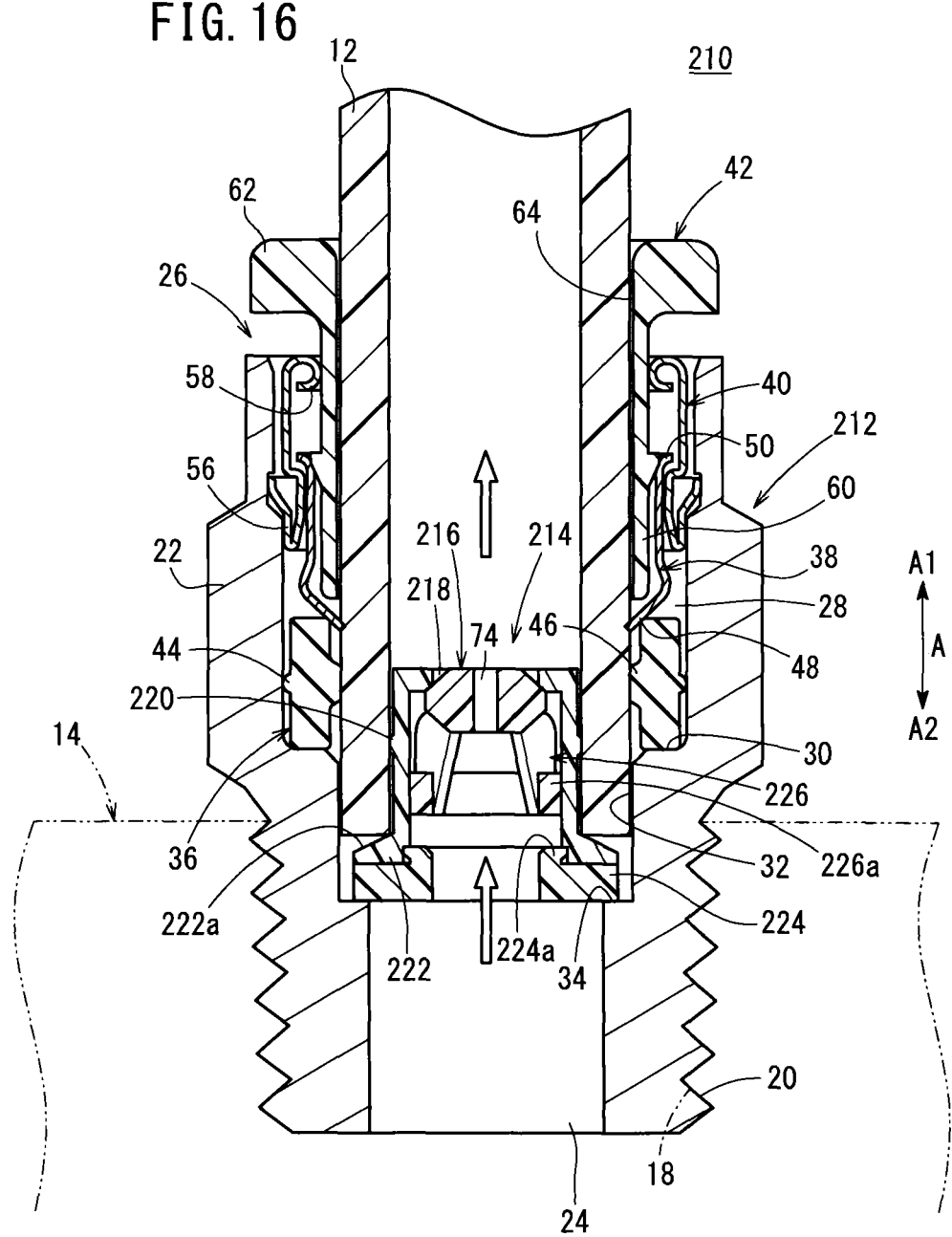
FIG. 16 is an overall vertical cross sectional view of a pipe joint according to a tenth embodiment of the present invention.

FIG. 16 is an overall vertical cross sectional view of a pipe joint 210 according to a tenth embodiment of the present invention.

The pipe joint 210, for example, is formed from a metal material such as stainless steel or the like, and is equipped with a body 212 having a substantially cylindrical shape. An orifice part 214 is disposed in the interior of the body 212.

Figure 17:
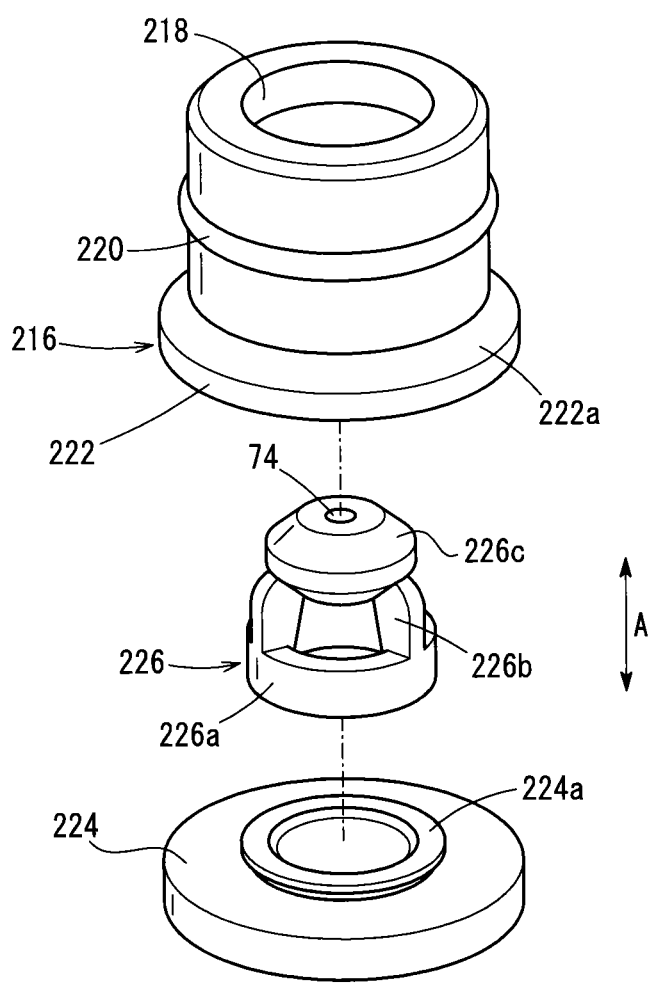
FIG. 17 is an exploded perspective view of an orifice member that constitutes part of the pipe joint.

As shown in FIGS. 16 and 17, the orifice part 214 comprises a tubular member 216 made of resin, which is installed on a distal end inner circumferential side of the fluid tube 12. The tubular member 216 is formed with an opening 218 on a distal end (ceiling plate) side thereof that is inserted in the fluid tube 12. On the outer circumferential surface of the tubular member 216, a projection 220 is formed therearound, which is placed in sliding contact with the inner circumferential surface of the fluid tube 12.

A flange 222 of the tubular member 216 is provided on the distal end side of the fluid tube 12, with an inclined surface 222a being formed on the flange 222. A resin made bottom plate 224 is press-fitted on the side of the flange 222. The bottom plate 224 has a substantially ring-like shape, and an engagement part 224a that bulges inwardly of the tubular member 216 is formed on a side in a central portion of the bottom plate 224.

The resin made orifice member 226 is arranged to be capable of advancing and retracting in an axial direction (the direction of the arrow A) in the interior of the tubular member 216. The orifice member 226 has a ring-shaped sliding portion 226a, which is arranged slidably on an inner circumferential surface of the tubular member 216, and in the sliding portion 226a, a bulbous portion 226c is formed integrally through a plurality of bridge portions 226b. The bulbous portion 226c is capable of blocking the opening 218 of the tubular member 216, and is formed with an orifice 74 in a central portion thereof.

According to the tenth embodiment, as shown in FIG. 16, fluid that is discharged from the fluid pressure device 14 is discharged to the body 212 along the direction of the arrows. Consequently, the orifice member 226 is moved inwardly of the tubular member 216 due to a change in pressure, and the bulbous portion 226c comes into contact with the circumferential surface that forms the opening 218. Therefore, the fluid that is introduced to the body 212, after the flow thereof has been controlled by passing only through the orifice 74 of the orifice member 226, is discharged into the fluid tube 12.

Figure 18:
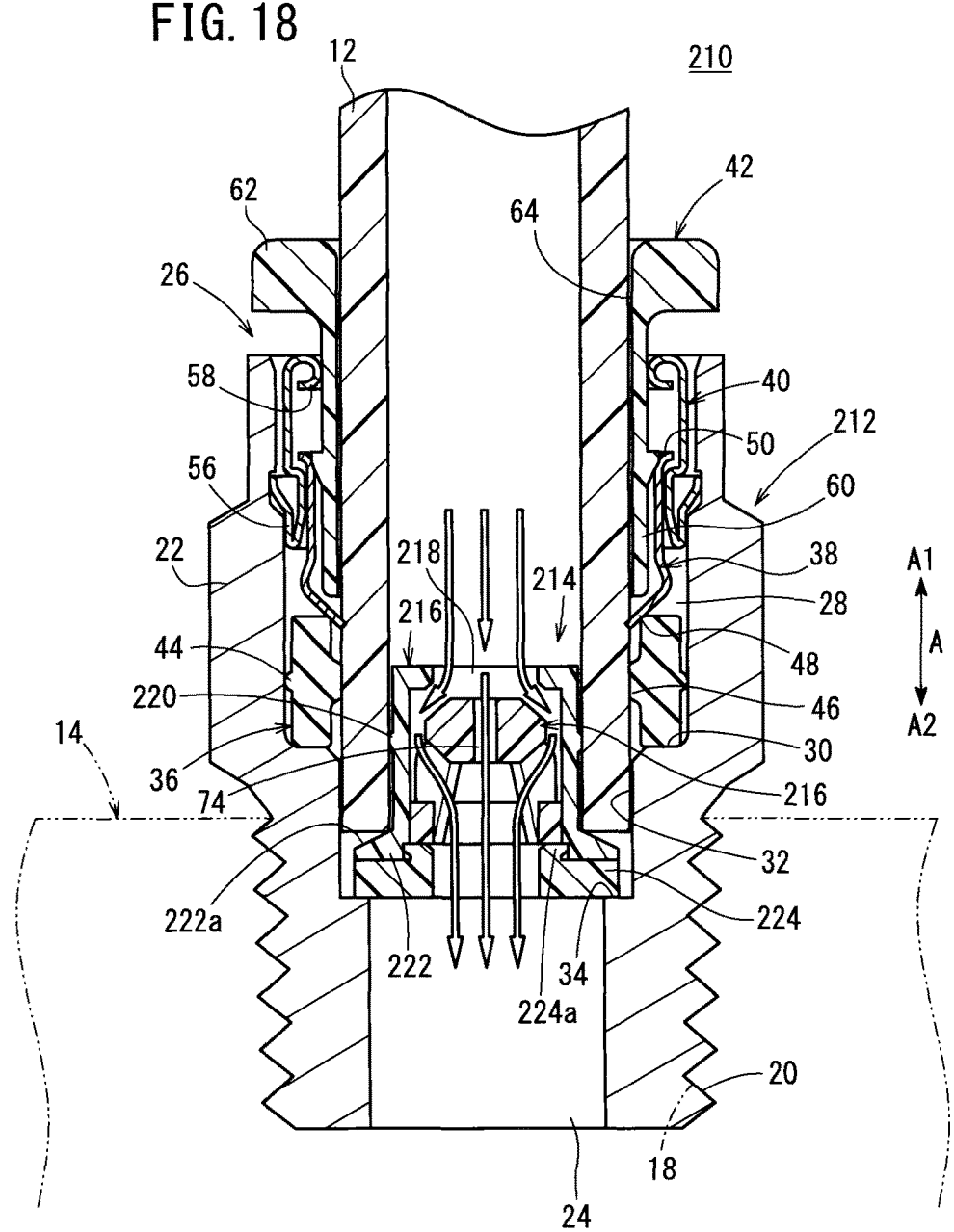
FIG. 18 is a schematic view illustrating a freely flowing state of the pipe joint.

On the other hand, as shown in FIG. 18, when fluid is supplied from the fluid tube 12, the fluid presses the orifice member 226 in the direction of the arrows. As a result, the orifice member 226 abuts against the engagement part 224a of the bottom plate 224. Consequently, the fluid that flows through the fluid tube 12, in addition to passing through the orifice 74, passes (flows freely) between the opening 218 and the bulbous portion 226c, and is supplied to the fluid pressure device 14.

Figure 19:
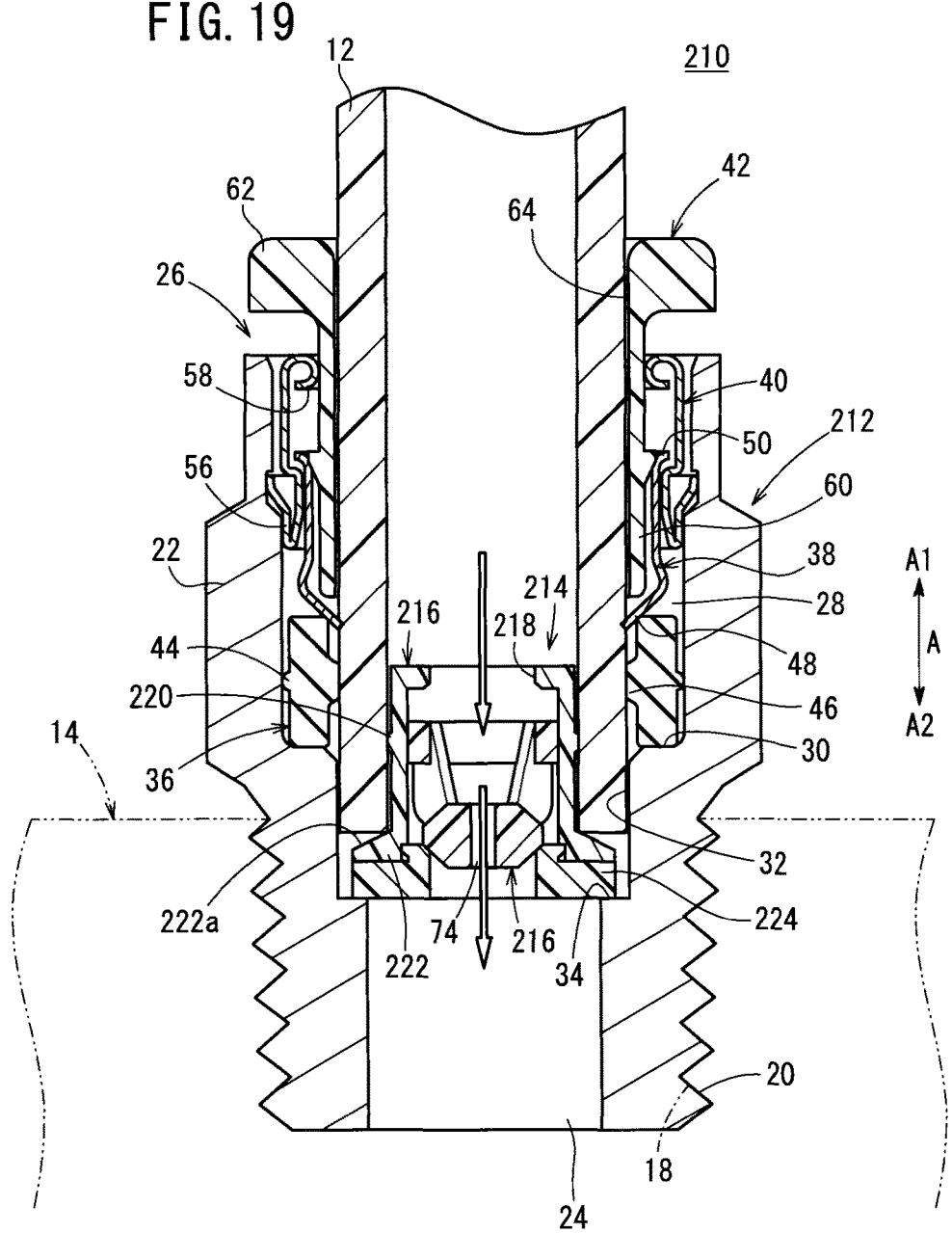
FIG. 19 is a schematic view of a controlled flow in a condition in which the orifice member is inverted in the pipe joint.

Further, with the tenth embodiment, as shown in FIG. 19, the orifice member 226 can be arranged in an inverted posture. Therefore, when fluid is supplied from the fluid tube 12, the orifice member 226 is moved to the side of the bottom plate 224 due to a change in pressure, and the bulbous portion 226c abuts against the engagement part 224a. Consequently, the fluid that is supplied to the fluid tube 12 and moves in the direction of the arrows, after the flow thereof has been controlled by passing only through the orifice 74, is supplied into the fluid pressure device 14.

Figure 20:
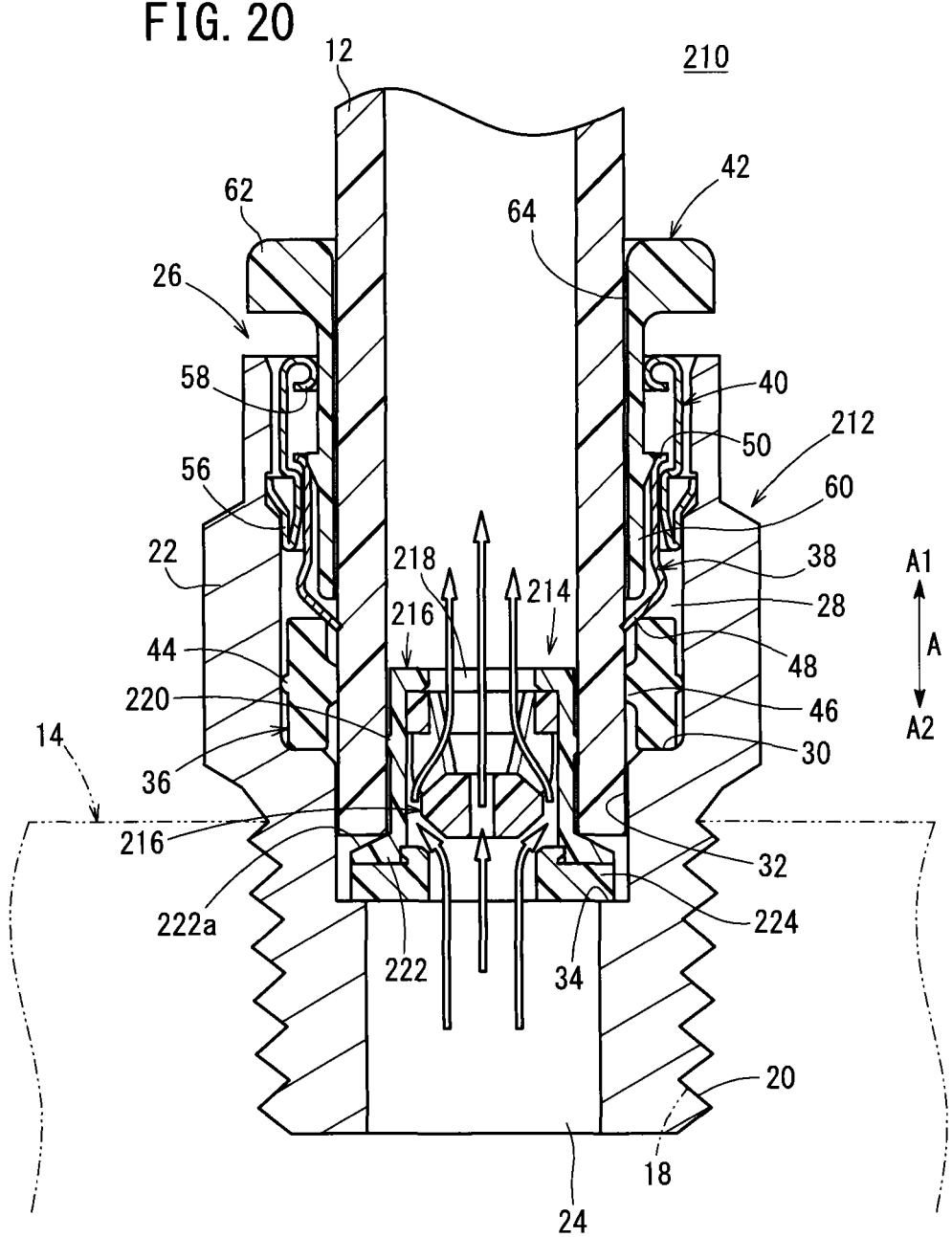
FIG. 20 is a schematic view illustrating a freely flowing state of the pipe joint.

Further still, as shown in FIG. 20, fluid that is discharged from the fluid pressure device 14 is introduced to the body 212, and moves the orifice member 226 to the side of the opening 218 of the tubular member 216. Consequently, the fluid, in addition to passing through the orifice 74, passes (flows freely) through the gap between the bulbous portion 226c and the engagement part 224a, and is discharged into the fluid tube 12.

Figure 21:
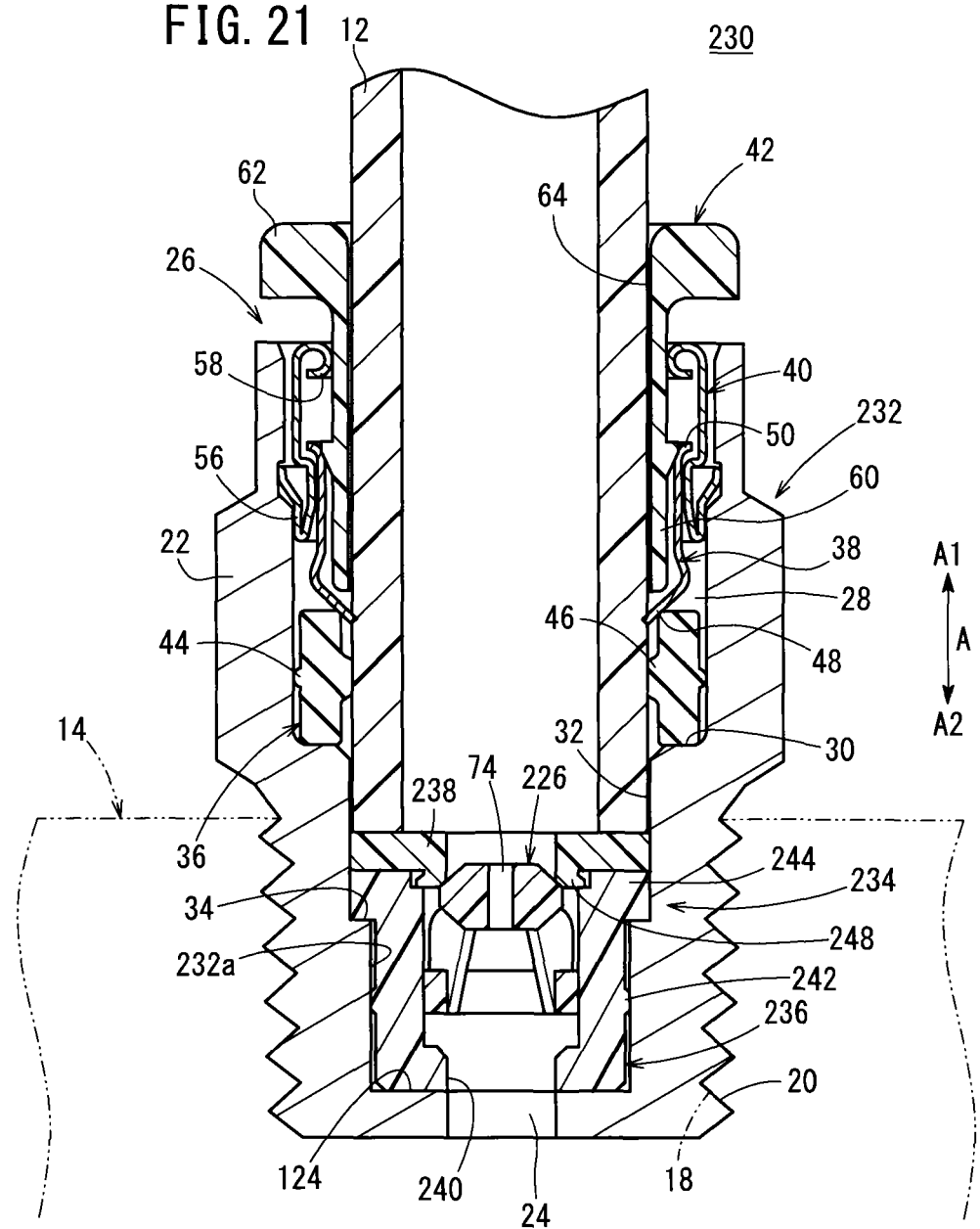
FIG. 21 is an overall vertical cross sectional view of a pipe joint according to an eleventh embodiment of the present invention.

FIG. 21 is an overall vertical cross sectional view of a pipe joint 230 according to an eleventh embodiment of the present invention. Constituent elements thereof, which are the same as those in the pipe joint 210 according to the tenth embodiment, are denoted by the same reference characters, and detailed description of such features is omitted.

The pipe joint 230, for example, is formed from a metal material such as stainless steel or the like, and is equipped with a body 232 having a substantially cylindrical shape. An orifice part 234 is arranged in the interior of the body 232 through the second stepped portion 34 and the third stepped portion 124.

Figure 22:
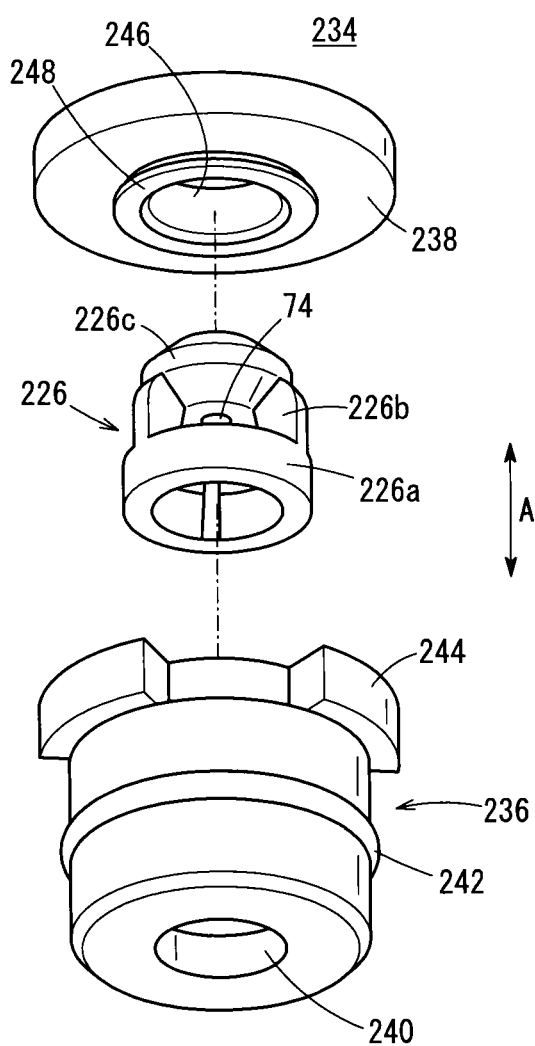
FIG. 22 is an exploded perspective view of an orifice member that constitutes part of the pipe joint.

As shown in FIGS. 21 and 22, in the orifice part 234, the orifice member 226 thereof is disposed movably in the axial direction (the direction of the arrow A) between a resin made tubular member 236 and a resin made ceiling plate 238. An opening 240 is disposed on one end side of the tubular member 236, and on an outer circumference thereof, a projection 242 is formed to bulge in a ring-like shape in sliding contact with an inner circumferential surface 232a of the body 232. On the other end side of the tubular member 236, a partially notched large diameter portion 244 is provided. The large diameter portion 244 is supported in abutment against the second stepped portion 34.

The ceiling plate 238 has a substantially ring-like shape with an opening 246 being disposed in a central portion thereof, and is formed with a projection 248 that extends around the opening 246. The bulbous portion 226c that makes up the orifice member 226 is seatable on the projection 248.

The orifice member 226 can be arranged in an inverted posture from the arrangement posture shown in FIG. 21, and more specifically, can be arranged in a posture in which the bulbous portion 226c thereof is arranged on the side of the opening 218. With the eleventh embodiment, flow of the fluid can be carried out similarly to the aforementioned tenth embodiment.

The pipe joint according to the present invention is not limited to the aforementioned respective embodiments, and it is a matter of course that various configurations could be adopted without deviating from the essence and gist of the present invention.

The invention claimed is:

1. A pipe joint connected to a fluid pressure device, comprising:
    a body in which a tube is inserted; and
    an attachment/detachment mechanism disposed in an interior of the body and which is capable of attaching and detaching the tube, wherein
    an orifice part through which the tube and the fluid pressure device communicate is disposed in the body,
    the orifice part is interchangeable, and
    on an outer circumference of the orifice part, a projection is provided that is in sliding contact with an inner circumference of the tube,
    the tube is, while the projection is in sliding contact with the inner circumference of the tube, inserted into an inner circumference of the attachment/detachment mechanism and installed to the body via the attachment/detachment mechanism,
    the orifice part includes:
        an orifice member which is interchangeable with respect to the body,
        a tubular member that is installed on the distal end inner circumference of the tube,
    the orifice member is capable of being disposed in an inverted posture in an interior of the tubular member,
    the orifice member is arranged in the interior of the tubular member so as to be capable of advancing and retracting in an axial direction of the tubular member.

2. The pipe joint according to claim 1, wherein:
    the orifice part comprises a plurality of the orifice members, which are interchangeable with respect to the body; and
    in each of the orifice members, there are provided respectively orifices whose opening diameters differ from each other.

* * * * *